(12) United States Patent
Fukuda et al.

(10) Patent No.: US 6,618,725 B1
(45) Date of Patent: Sep. 9, 2003

(54) METHOD AND SYSTEM FOR DETECTING FREQUENT ASSOCIATION PATTERNS

(75) Inventors: Takeshi Fukuda, Machida (JP); Hirofumi Matsuzawa, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/699,661

(22) Filed: Oct. 30, 2000

(30) Foreign Application Priority Data

Oct. 29, 1999 (JP) .......................................... 11-309582

(51) Int. Cl.[7] .............................................. G06F 17/30
(52) U.S. Cl. ................................................ 707/6; 707/3
(58) Field of Search ............................... 707/1, 2, 3, 7, 707/100, 101; 400/63

(56) References Cited

U.S. PATENT DOCUMENTS 6,289,353 B1 * 9/2001 Hazlehurst et al. ............. 704/7
6,304,870 B1 * 10/2001 Kushmerick et al. ......... 400/63
6,363,377 B1 * 3/2002 Kravets et al. ............. 707/101

OTHER PUBLICATIONS

I. Muslea, S. Minton, and C.A. Knoblock. Stalker: Learning extraction rules for semistructured, Web–based information sources. In Proceedings of AAAI–98 Workshop on AI and Information Integration, Technical Report WS–98–01, AAAI Press, Menlo Park, CA (1998.*

* cited by examiner

Primary Examiner—Diane D. Mizrahi
Assistant Examiner—Yicun Wu
(74) Attorney, Agent, or Firm—Ronald L. Drumheller

(57) ABSTRACT

A text-mining system and method automatically extracts useful information from a large set of tree-structured data by generating successive sets of candidate tree-structured association patterns for comparison with the tree-structured data. The number of times is counted that each of the candidate association patterns matches with a tree in the set of tree-structured data in order to determine which of the candidate association patterns frequently matches with a tree in the data set. Each successive set of candidate association patterns is generated from the frequent association patterns determined from the previous set of candidate association patterns.

6 Claims, 20 Drawing Sheets

Pattern matching

Outline of the present invention

Pattern matching

Pattern P = {(1,{2}),(2,{4}),(2,{5})}

Transaction T = {(1,{2,3}),(2,{3,4}),(2,{3,5}),(2,{4,5}))}

A plurality of matching

Block diagram of a frequent association pattern extraction system

Flowchart of the entire system

Candidate generating device

Terminal element

Flowchart of candidate pattern generation

Example of Join

Block diagram of a counting device

A, B and C are labels of the groups in the pattern

Tree-structure limited to two-level

Counting of frequent association patterns

Classification of patterns

| Frequent 3-patterns | | Candidate 4-patterns | | | |
|---|---|---|---|---|---|
| | | after join | | after prune | |
| p1 | {(1 {}) (1 {3})} | c1 | {(1 {}) (1 {3,5})} | c3 | {(1 {3}) (1 {5})} |
| p2 | {(1 {}) (1 {5})} | c2 | {(1 {}) (2 {}) (2 {4})} | c4 | {(1 {3}) (2 {4})} |
| p3 | {(1 {}) (2 {4})} | c3 | {(1 {3}) (1 {5})} | | |
| p4 | {(1 {3}) (2 {})} | c4 | {(1 {3}) (2 {4})} | | |
| p5 | {(2 {}) (2 {4})} | | | | |

Example of candidate pattern generation

Sequent matching (1)

Sequent matching (2)

Block diagram of a counter

Flowchart of counting method of two-level tree-structure

Procedure for generating a sequence for candidate patterns

A hash-tree strong ⟨L(1) I(3) I(4)⟩, ⟨L(1) I(3) I(5)⟩, ⟨L(1) L(2) I(3)⟩, ⟨L(1) L(2) I(4)⟩, ⟨C(1) I(2)⟩, ⟨I(2) I(3) I(4)⟩, ⟨L(2) I(3) I(5)⟩ and ⟨L(2) I(4) I(5)⟩

Hash-tree

Block diagram of sequent matching

Bipartite graph matching

Natural language

> The customer had installed the software,
> and is now getting a fatal error when she pushes a key.

Circled words are predicative verbs.

Example of a network

| predicate | arguments |
|---|---|
| install | {customer, software} |
| get | {customer, fatal error, now} |
| push | {she, key} |

Predicate-argument tuple

Constructed structured tree

Generated structured data

METHOD AND SYSTEM FOR DETECTING FREQUENT ASSOCIATION PATTERNS

FIELD OF THE INVENTION

The present invention relates to a method and a system for detecting important patterns from a set of data with complex structure, in particular, for rapidly and automatically detecting said patterns while considering the data structure.

RELATED ART

Data that has structure but does not have clearly fixed structure is increasing lately, such as data with complex links on World Wide Web (WWW) and collections of documents (text database) written in natural languages. Such data that does not have clearly fixed structure is called semi-structured data. As semi-structured data is unknown as to its structure itself, a fixed view cannot be given for detecting patterns of structure. In general, data that has complex structure can be represented by using graphs comprising vertices and edges. For instance, a sentence written in a natural language can be expressed as a network among concepts through parsing and semantic analysis. Also, organization and employees of a company can be represented as a graph combining related entities. When a set of such graphs is given as a database, it is possible, if subgraphs frequently appearing as patterns therefrom can be detected, to extract important concepts contained in the set of data. Nevertheless, an algorithm for solving this problem at high speed is not known.

Data mining is known as a method for detecting patterns of data structure from a set of data. Association rules is well known as a pattern that can be detected by this data mining. Conventionally, when detecting association rules, a database is taken for a set of transactions and a transaction is considered as a set of items. And sets of items frequently appearing (co-occurring) in transactions in the database are acquired, and association rules are derived therefrom, In this case, subject data is sets of simple items, and the derived patterns are also sets of simple items. Besides, complex data structure can be simplified by having a view given by a user. Conventionally, in the case of application of data mining to complex data, it has been applied in fact to data that is simplified by giving such a fixed view. It is limited, however, to the cases where a fixed view can be given, and thus such simplification is not easy in a situation in which it is not known in advance as to where in the complex structure attention should be paid. Conversely, there is a problem in data mining that it is difficult to give a view fixed in advance since its purposes are detection of unknown knowledge and analysis of data. In addition, because the data structure is decomposed and converted into data in a flat format in advance in order to detect patterns by paying attention to a view fixed in advance, patterns cannot be detected by effectively using the data structure. Moreover, as a matter of course, the portions to which attention was not paid are not covered by detection.

SUMMARY OF THE INVENTION

Accordingly, an object of the present invention is to provide a method and a system for detecting important patterns contained in a set of data.

Another object is to provide a method and a system for detecting important patterns contained in a set of data at high speed and in a short time.

A further object is to provide a method and a system for detecting important patterns contained in a set of data by effectively using the data structure.

A still further object is to provide a method and a system for mining a set of data without giving a fixed view.

The present invention is a system, to solve the above problems, for detecting frequent association patterns from databases of data with tree-structure by using candidate patterns for counting, comprising:
 (1) means for counting patterns matching with candidate patterns from the databases;
 (2) means for detecting frequent patterns from the result of the counting;
 (3) means for generating candidate patterns for next counting from the frequent patterns detected.

FIG. 1 shows an overview of the present invention. To detect frequent association patterns from databases of data with tree-structure, it consists of block 110 for counting patterns matching with candidate patterns from the databases, block 120 for detecting frequent patterns from the result of the counting, and block 130 for generating candidate patterns for next counting from the frequent patterns detected.

As another form, the present invention is a text-mining system for extracting useful concepts from a large volume of text data, comprising;
 (1) means for parsing sentences in the text data;
 (2) means for generating structured trees based on the results of the parsing;
 (3) means for creating databases comprising sets of the structured trees;
 (4) means for counting candidate patterns for counting from the databases;
 (5) means for detecting frequent patterns from the result of the counting;
 (6) means for generating candidate patterns for next counting from the frequent patterns detected.

DESCRIPTION OF THE PREFERRED EMBODIMENTS

Before explaining the preferred embodiments of the present invention, some of the terms are defined as follows.

Preliminaries $I=\{i_1, i_2, \ldots, i_m\}$ is a set of literals called items. A labeled set $g=(1, A)$ is a pair of a label $1 \in I$ and a set; of labeled sets $A=\{g\}$. Also, labeled sets are called groups. $G=I \times set(G)$ denotes the domain of groups. D is a set of transactions, Each transaction T is a set of groups ($T \subseteq G$). Each transaction has a unique identifier and so does each group in a transaction. A "structured association pattern," or "pattern" for short, is also a set of groups. Moreover, in the specification, a group comprising only a label 1 $g=(1,\{\})$ may simply be called item 1.

Figure 1:
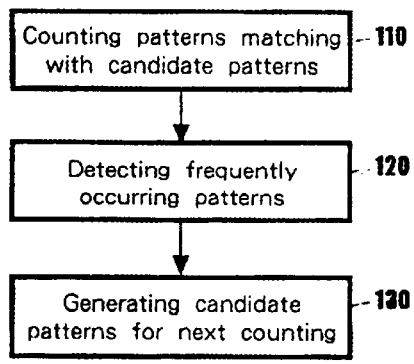
FIG. 1 is a diagram showing the outline of the present invention.
Figure 2:
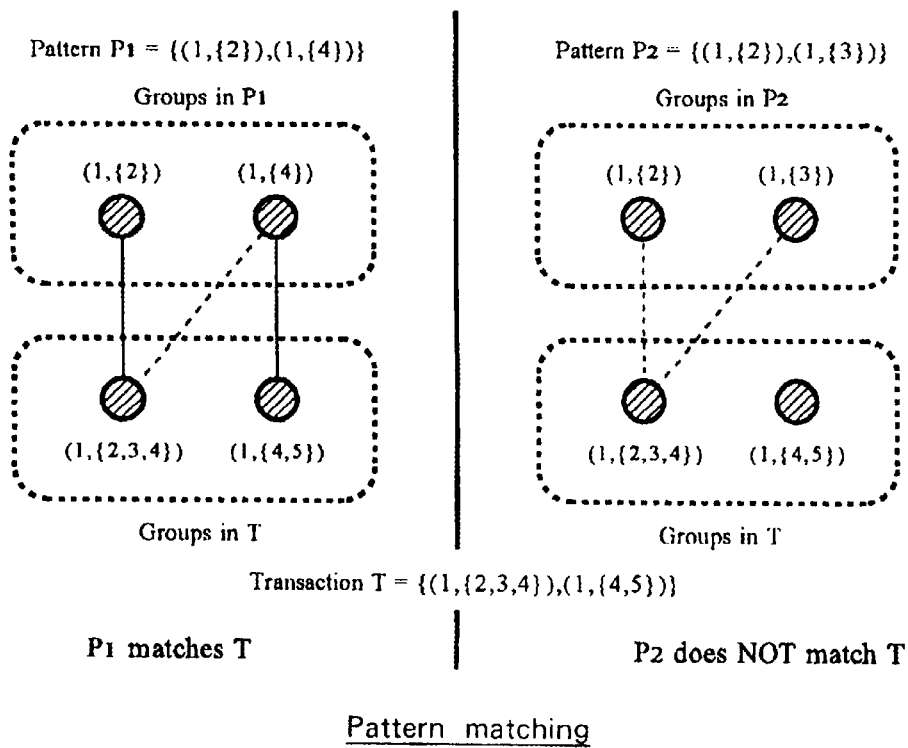
FIG. 2 is a diagram explaining pattern matching.

Next, pattern matching is explained. If a group $g=(1_g, A_g)$ matches with another group $h=(1_h, A_h)$, it means that both labels are equally ($1_g=1_h$) and $A_g$ is a subset of $A_h$ ($A_g \subseteq A_h$) If a pattern $P=\{g_1, g_2, \ldots, g_m\}$ matches with a transaction $T=\{h_1, h_2, \ldots, h_n\}$, it means that, for each element $g_i \in P$ in a pattern P, a matching group $h_j \in T$ separately exists. Here, it should be noted that, in matching of a plurality of groups, each of separate groups must match one another. For instance, a pattern $P_1=\{(1, \{2\}), (1, \{4\})\}$ as in FIG. 2 matches with a transaction $T=\{(1, \{2, 3, 4\}), (1, \{4, 5\})\}$, while $P_2=\{(1, \{2\}), (1, \{3\})\}$ does not match T. It is because both groups of $P_2$ match only the first group of transaction T.

Figure 3:
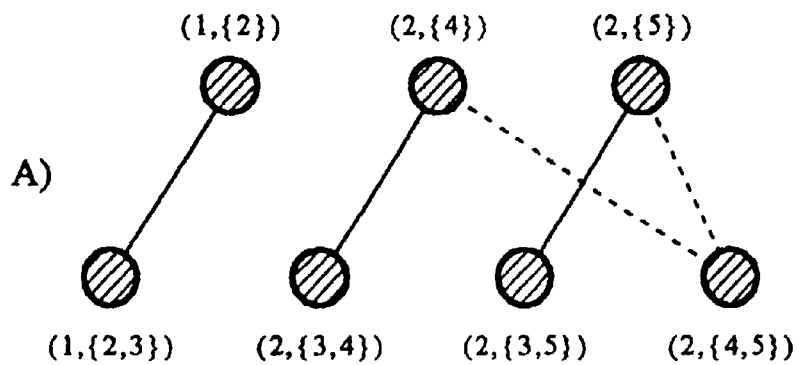
FIG. 3 is a diagram explaining a plurality of matching.
Figure 3:
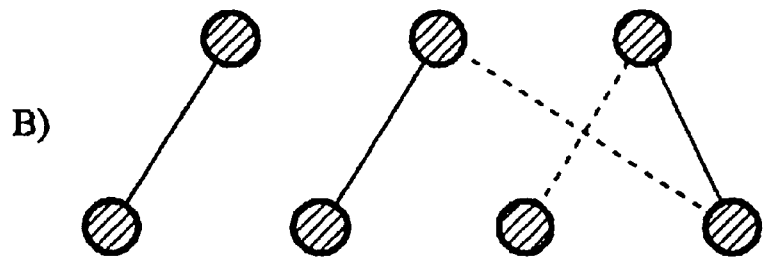
Figure 3:
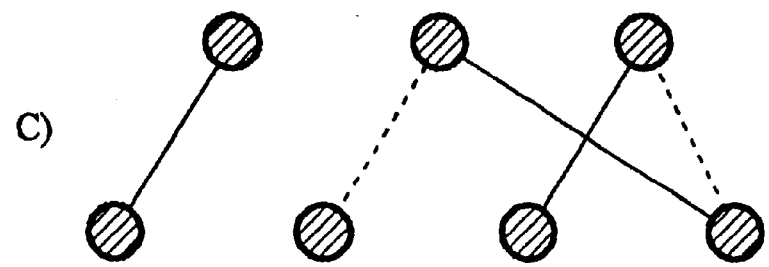

Next, support (occurrence frequency) is explained. If a pattern P has support s for set of transactions D, it means that a pattern P matches with s % of transactions in set of transactions D. However, even if a pattern matches with a transaction in a plurality of ways, count of support for the transaction is only 1. For instance, a pattern $P=\{(1, \{2\}), (2, \{4\}), (2, \{5\})\}$ matches with a transaction $T=\{(1, \{2,3\}), (2, \{3,4\}), (2, \{3,5\}), (2, \{4,5\})\}$, while matching such as FIG. 3B) and FIG. 3C) exists in addition to the manner of matching as in FIG. 3A). Even in such a case of matching in a plurality of ways, count of support is only 1.

Next, frequent association patterns are explained. The problem of mining structured association patterns is, when a set of transactions D is given, to generate all the structured patterns that match more transactions than the user-specified minimum support threshold (minsup) If the support for a pattern is greater than minsup, the pattern is referred to as "frequent" and is called a frequent pattern. If $X \cup Y = P$ and $X \cap Y = \Phi$ with X and Y as subsets of a pattern P, a rule in the form of $X \rightarrow Y$ can be derived from a pattern P. Thus, it is possible, by finding a structured pattern through the present invention, to derive a structured rule. It is assumed that each group is taken for a set, and items in a set are sorted according to a prescribed rule neglecting sequence and without losing generality. Moreover, in this specification, it is explained on the assumption that they are sorted in a lexicographic order. Likewise, it is assumed that the groups of transactions and patterns are sorted in a lexicographic order of their labels. If a group $g_1=(1_i, A_1)$ and a group $g_2=(1_2, A_2)$ have the same label, namely $1_1=1_2$, sets of items $A_1$ and $A_2$ are compared in a lexicographic order from the first element so that they can be ranked when a different element appears for the first time. A case as above occurs, since it is allowed for a plurality of groups to have the same label during a transaction. It is also possible, by assigning a special label called null to each group, to handle a mere set of sets without a label.

Pattern Extraction System

Figure 4:
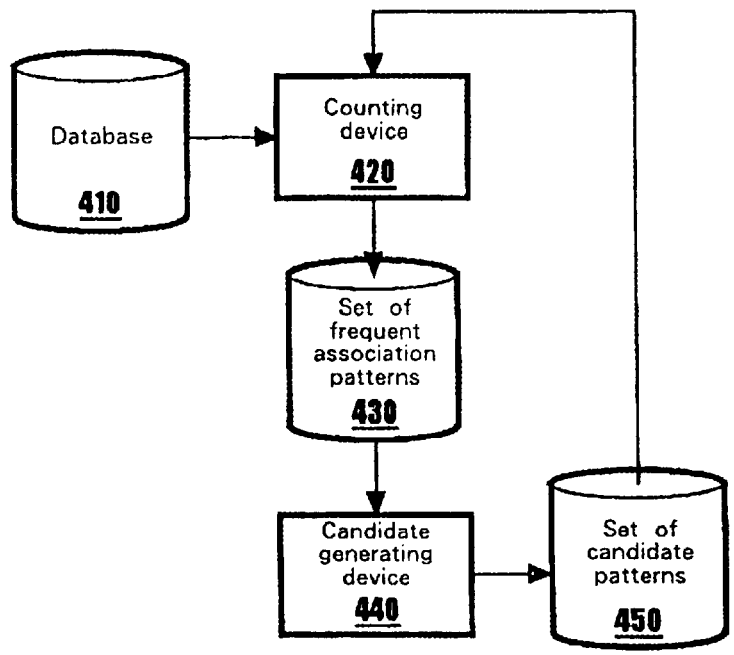
FIG. 4 is a block diagram showing a frequent association pattern extraction system of the present invention.

The system for extracting frequent structured association patterns (frequent association patterns) is explained. FIG. 4 shows a block diagram of the frequent association pattern extraction system of the present invention. In FIG. 4, a set of transactions (a set of data) is stored in a database (410). One transaction means one piece of structured data (tree-structured data). Input to this system for extracting frequent association patterns is a database (410) storing large amounts of transactions. A counting device (420) is a device for counting occurrence frequency of patterns that inputs a database (410) and a set of candidate patterns (450) and outputs a set of frequent association patterns (430). As a result of summary by a counting device (420), only the patterns of high occurrence frequency (support) are taken out of a set of candidate patterns (450) and stored, which are namely a set of frequent association patterns (430). A candidate generating device (440) is a device for inputting a set of frequent association patterns (430) of size k and outputting a set of candidate patterns (450) of size k+1 to be counted next. A set of candidate patterns (450) stores the patterns to be counted by a counting device (420). Here, candidate patterns that may become frequent association patterns are collected.

Figure 5:
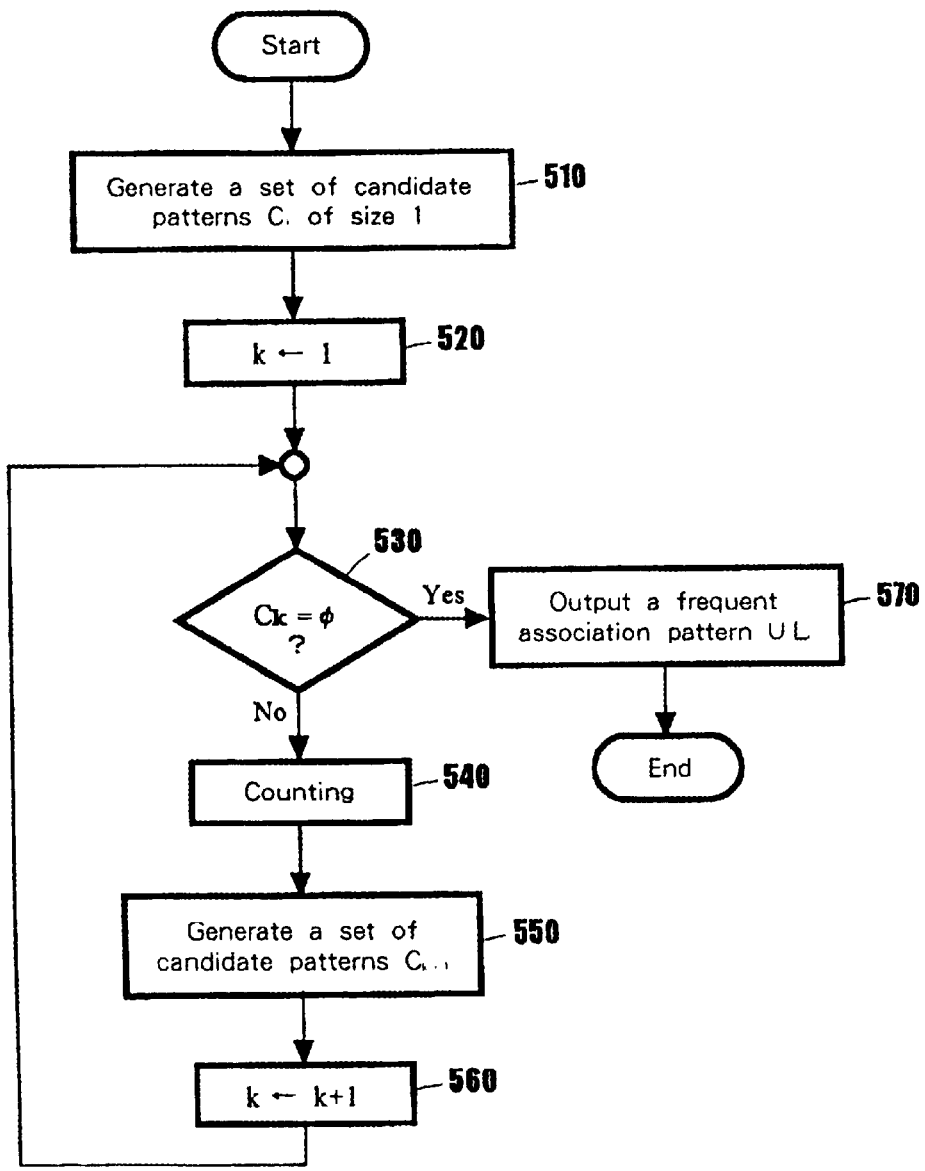
FIG. 5 is a flowchart of extracting frequent association patterns in the present invention.

Before explaining the flow of extracting frequent association patterns in the present invention, size of a pattern is defined. Size of a pattern is a total of items included in a pattern (including labels). A pattern of size k is called k-pattern. An entire set of frequently appearing patterns of size k is described as $L_k$ and an entire set of candidate patterns of size k as $C_k$. FIG. 5 shows a flowchart of a method of extracting frequent association patterns in the present invention. Also, in this flowchart, size of a pattern is stored in a variable k and managed.

The entire method of extracting frequent association patterns is as follows. First, patterns comprising a single item are counted, Also, in order to summarize patterns comprising a single item (patterns of size k=1), a set of candidate patterns $C_1$ to be counted is set (510) and a variable k to store size is set at 1 (step 520). In setting a set of candidate patterns $C_1$ of size 1 (step 510), a set of patterns $\{(1, \Phi)|1 \in I\}$ only comprising labels and a set of patterns $\{(*, \{i\})|i \in I\}$ having a special label "*" to match all the labels are inputted in $C_1$. Here, $\Phi$ represents a null set. In a conditional branch (530), it is checked whether a generated candidate pattern $C_k$ is null ($C_k=\Phi$) in generation of a set of candidate patterns (step 510 and step 550). If $C_k$ is null, it proceeds to step 570. If $C_k$ is not null, counting of frequent association patterns is not yet completed, so it proceeds to step 540. If $C_k$ is not null, counting (step 540) is performed. In counting (step 540), the number of transactions which the patterns, namely the elements of a set of candidate patterns $C_k$ are matching is acquired, and those of high occurrence frequency are acquired therefrom as a set of frequent association patterns $L_k$. If a set of frequent association patterns $L_k$ is acquired by counting (step 540), then the size is increased by 1 and a set of candidate patterns $C_{k+1}$ is generated to perform counting likewise (step 550). To increase the size by 1 and perform counting again, variable k storing size is increased by 1 (step 560), and then it goes to a conditional branch (step 530). In a conditional branch (step 530), the size is increased by 1 until $C_k$ becomes null while repeating counting (step 540) and generation of a set of candidate patterns (step 550). In a conditional branch (step 530), if $C_k$ becomes null (if yes), it proceeds to step 570. In step 570, a finally required set of frequent association patterns is outputted. A finally required set of frequent association patterns means a set of sums of frequent association patterns of size 1 to k−1, namely $L_1, L_2, L_{k-1}$ (i is up to k−1 because $C_k$ is a null set and thus $L_k$ is also a null set.).

Candidate Generation

Figure 6:
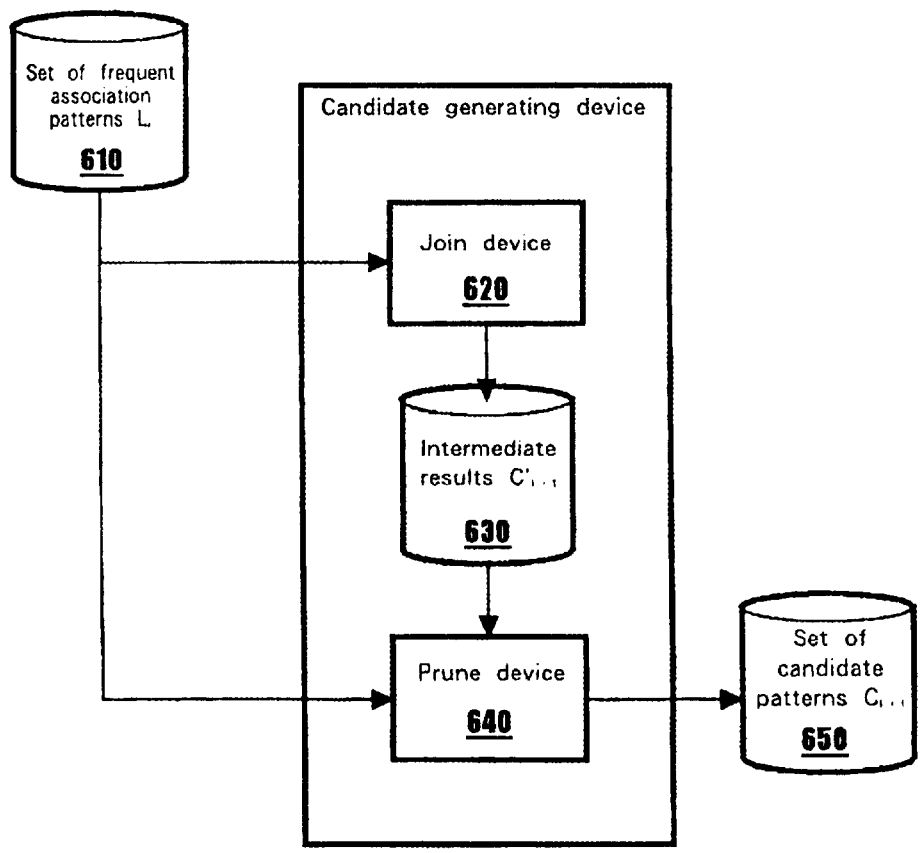
FIG. 6 is a block diagram of a candidate generating device.

In block 440 of FIG. 4 and step 550 of FIG. 5, a set of candidate patterns $C_{k+1}$ of size k+1 is generated from a set of frequent association patterns $L_k$ of size k. Details of candidate pattern generation are described hereafter. FIG. 6 shows a detail diagram of a candidate generating device. A candidate generating device is a device for generating a set of candidate patterns of large size from a set of frequent association patterns of a certain size, receiving a set of frequent association patterns $L_k$ (610) as input and outputting a set of candidate patterns $C_{k+1}$ (650). A set of frequent association patterns 610 is a set of frequent association patterns $L_k$ of size k inputted into a candidate generating device. A Join device (620) receives a set of patterns $L_k$ (610) of size k as input and performs Join to output a set of patterns of size k+1 as an intermediate result (630). The method of Join is detailed in the paragraphs hereafter, An intermediate result 630 is patterns of size k+1 generated as a result of Join. This is an intermediate result of a candidate generating device. A Prune device (640) receives an intermediate result (630) generated as a result of Join and a set of frequent association patterns $L_k$ (610) as input, and performs Prune to output a set of candidate patterns $C_{k+1}$ of size k+1 (650) by screening out patterns determinable as infrequent in advance. Prune is detailed in the paragraphs hereafter. A set of candidate patterns 650 is a set of candidate patterns $C_{k+1}$ of size k+1 generated as a result of Join and Prune, which is output of a candidate generating device. Moreover, a method of description is explained a little before explaining a method of generating candidate patterns.

Method of Description

Figure 7:
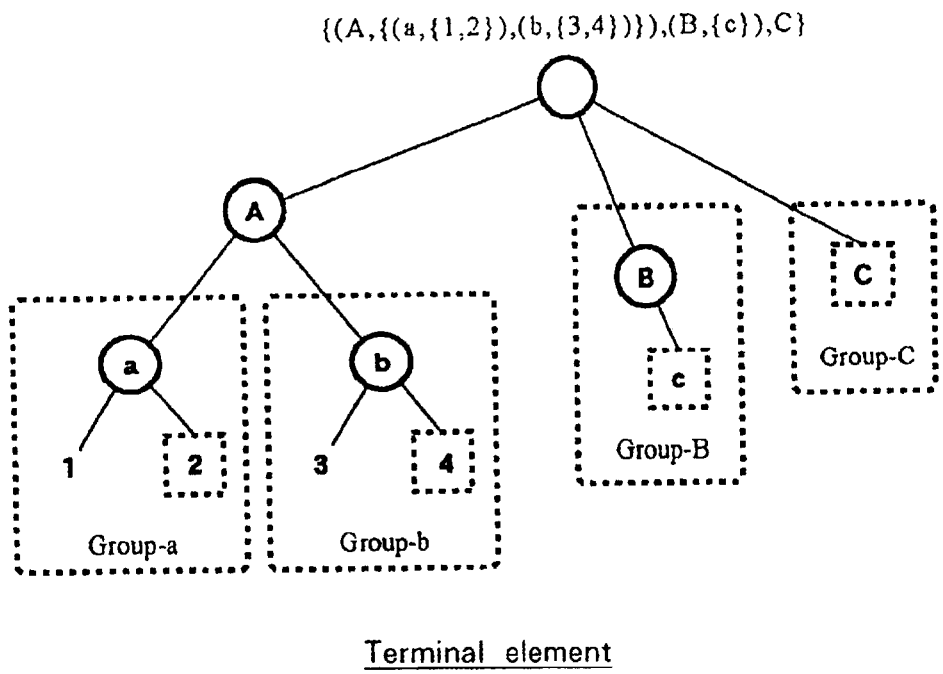
FIG. 7 is a diagram explaining terminal elements.

If a pattern q matches with a pattern p, q is a subpattern of p. A pattern is tree structure, and groups in a pattern are sorted. Here, by way of example, pattern p={A{(a, {1, 2}), (b, {3, 4})}, (B, {c},), C} (see FIG. 7). A group (1, { }) comprising only label 1 has 1 as a leaf node. Elements 1, 2, 3, 4, c, C in the pattern are a group comprising only labels, thus forming a leaf node. Here, a terminal element of a pattern is defined as follows. An element that is a leaf node of a pattern and located at the very last among brother nodes when sorted is a terminal element. Here, brother nodes means a set of child nodes of the same parent node (for instance, a and b). As shown in FIG. 7, this pattern p has four terminal elements {2, 4, c, C}.

Generation of candidate patterns comprises the two phases of the Join phase and the Prune phase. Before explaining the method of the present invention, the conventional Join method is explained here. If a subpattern acquired by removing an item of a certain fixed location of a pattern a is the same as a subpattern acquired by removing an item of a certain fixed location of a pattern b, a candidate pattern is generated by joining a and b. By a well-known method, the last element is used as an element of a fixed location. Namely, when there are a pattern a={$a_1, a_2, \ldots, a_k$} and a pattern b={$b_1, b_2, \ldots, b_k$}, and if only the last element is different (namely, $a_1=b_1, \ldots, a_{k-1}=b_{k-1}$), a and b are joined to generate a new candidate pattern c={$a_1, \ldots, a_{k-1}, a_k, b_k$} (provided $a_k<b_k$). This method works very efficiently even if there are many patterns. However, as to a structured pattern, it cannot remove the last element or an element of a fixed location. It is because doing so will violate the constraints of a structured pattern. For instance, a case of p={(1, {3}), (1, {4})} is considered. There do not exist patterns a and b, different only in the last elements, to be joined to create a pattern p. To create such patterns, it is necessary to join $p_1$={(1, { }), (1, {4})} and $p_2$={(1, {3}), (1, { })}={(1, { }), (1, {3})}. However, joining $p_1$ and $p_2$ will generate another pattern p'={(1, { }), (1, {3, 4})}. Thus, the conventional simple candidate generation method cannot be applied to generation of structured candidate patterns.

Candidate Patterns Generation Method

Figure 8:
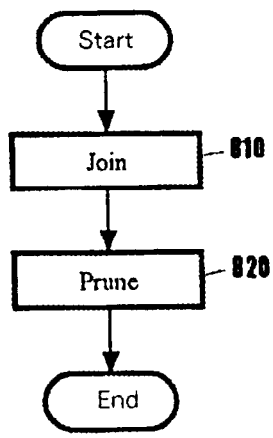
FIG. 8 is a flowchart of candidate pattern generation.

To generate candidate patterns, a set of frequent association patterns $L_k$ is inputted, and a set of candidate patterns $C_{k+1}$ of size (k+1) is outputted. FIG. 8 shows the flowchart. In FIG. 8, the candidate patterns generation method comprises the two phases, namely the Join phase (step 810) and the Prune phase (step 820).

<Join Phase (Step 810)>

Figure 9:
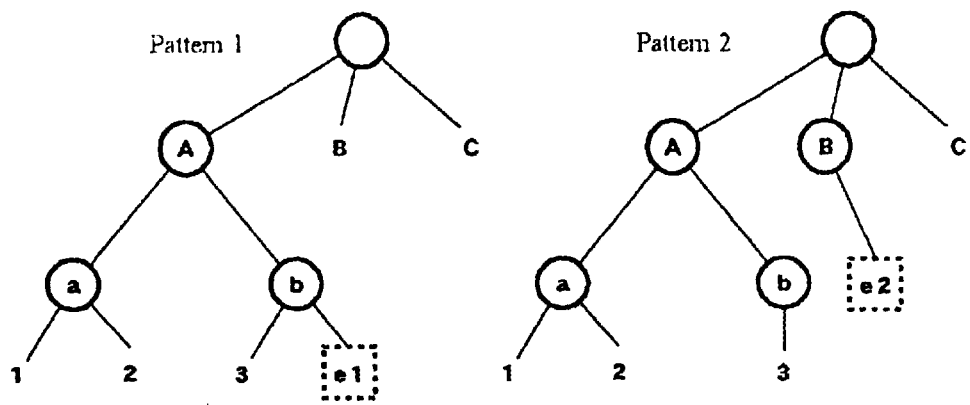
FIG. 9 is a diagram explaining Join.
Figure 9:
Figure 9:
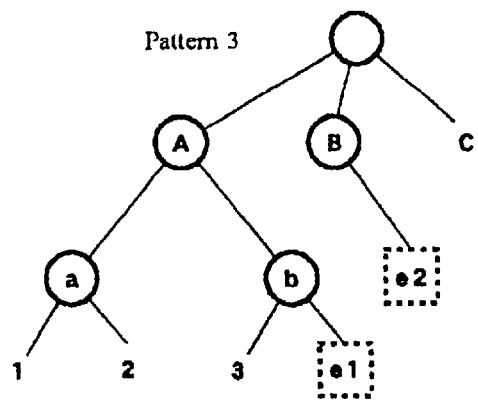

In this phase, patterns of size (k+1) are generated by joining $L_k$ and $L_k$. If a subpattern missing one of the terminal elements of a pattern $p_1$ matches with a subpattern missing one of the terminal elements of a pattern $p_2$, the pattern $p_1$ and pattern $p_2$ are joined. A candidate pattern generated by joining $p_1$ and $p_2$ is a pattern made by adding the element missing from pattern $p_2$ to the original location in pattern $p_1$. For instance, it is assumed that pattern 1 and pattern 2 shown in FIG. 9 exist respectively in $L_k$. In this case, a subpattern missing an element e1 from pattern 1 matches with a subpattern missing an element e2 from pattern 2. Thus, these are joined to generate pattern 3, which is a candidate pattern. Here, both e1 and e2 are terminal elements, The candidate patterns thus generated by joining are kept as an intermediate result $C'_{k+1}$.

<Prune Phase (Step 820)>

$C'_{k+1}$ generated by the Join phase contains candidate patterns of size k+1. For a candidate pattern of size k+1, several subpatterns of size k may be generated by removing one element, Among such subpatterns, if any of them has a support value (occurrence frequency) smaller than the minimum support value (threshold) (namely, if not included in a set of frequent association patterns $L_k$), the candidate pattern is removed from $C'_{k+1}$. This is checked for all the patterns of $C'_{k+1}$, and the finally remaining patterns are outputted as a set of candidate patterns $C_k$. If a subpattern generated from a certain pattern is not a frequent association pattern, then the pattern cannot occur frequently, And such patterns that cannot occur frequently can be removed in advance to decrease wasteful counting work and improve efficiency in counting.

Counting of Frequent Association Patterns

Figure 10:
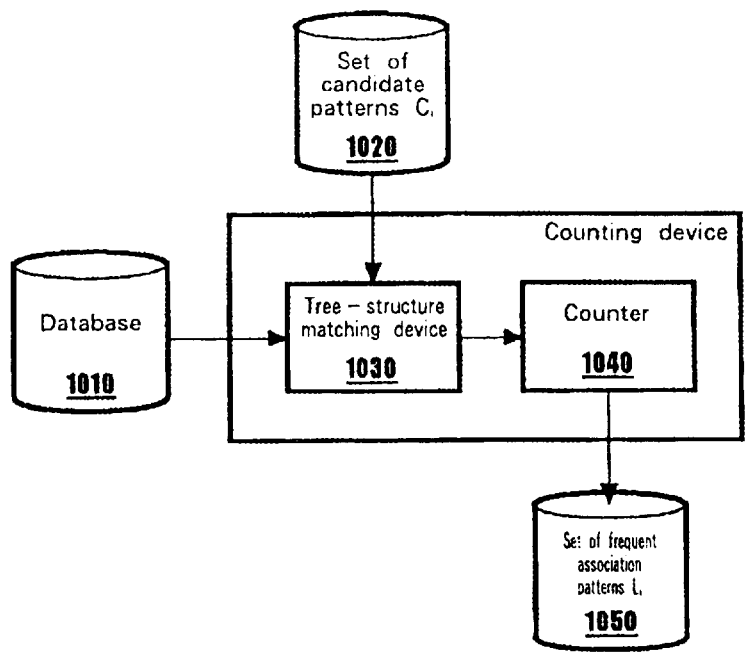
FIG. 10 is a block diagram of a counting device.

FIG. 10 is a detail diagram of a counting device (block 420 of FIG. 4). A counting device is a device for counting occurrence frequency of a pattern, receiving a database (1010) and a set of candidate patterns $C_k$ (1020) as input and outputting a set of frequent association patterns $L_k$ (1050). The database (1010) stores a set of transactions. A set 1020 is a set of candidate patterns $C_k$. A tree structure matching device (1030) reads transactions one by one to check whether there is a pattern matching with each of them by comparing with all the patterns in $C_k$, and then inputs all the matching patterns on a counter (1040). The counter (1040) counts occurrence frequency of all the patterns of a set of candidate patterns $C_k$. More specifically, for the patterns (patterns matching with the transactions) inputted from the tree structure matching device (1030), the counter for each pattern is increased by 1, A set of frequent association patterns (1050) is a set of frequent association patterns $L_k$, which is generated, as a result of performing the above counting work for all the transactions, by removing from a set of candidate patterns $C_k$ the patterns of which occurrence frequency counted by the counter is lower than the threshold of all the patterns of the set of candidate patterns $C_k$.

Method of Counting Frequent Association Patterns

Figure 11:
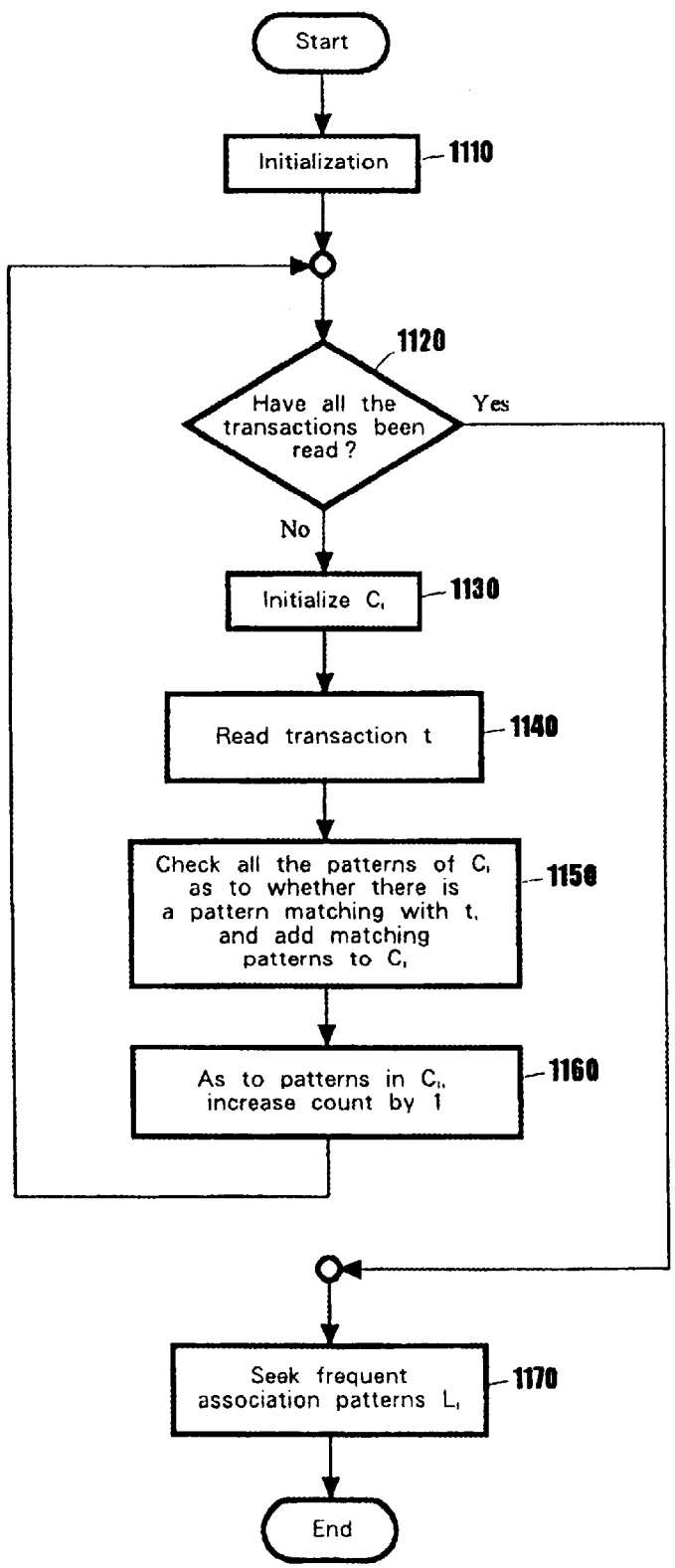
FIG. 11 is a flowchart of counting frequent association patterns.

The method of counting frequent association patterns is basically to read transactions t one by one from a database to check all the patterns of a set of candidate patterns $C_k$ as to whether each of them matches with the transactions, and if it does match, add 1 to count of the pattern. It is repeated for all the transactions. It is determined by matching mutual tree structures whether a transaction t matches with a candidate pattern, FIG. 11 shows a flowchart of method of counting frequent association patterns. First, initialization (step 1110) is performed. This includes setting count at 0 on the counter for all the patterns in $C_k$. Subsequently, it is checked whether all the transactions have been read (step 1120). If yes, counting work is completed and it goes to step 1170. If no, it goes to step 1130. In step 1130, initialization of a set $C_t$ is performed, which temporarily stores matching patterns ($C_t$ is rendered as $\Phi$) In step 1140, one transaction t is read from the database. In step 1150, all the patterns p in $C_k$ are checked as to whether each of them matches with the read transaction t. If it does match, the pattern is added to $C_t$. In step 1160, for all the patterns included in $C_t$, their count is increased by 1. If step 1160 is completed, it goes to step 1120. This is repeated for all the transactions. If it is completed for all the transactions, it proceeds to step 1170. In step 1170, for all the patterns of a set of candidate patterns $C_k$, it is checked whether count is at the threshold (minimum support value) or higher. And any pattern at the threshold or higher is added to $L_k$. Consequently, an acquired set of frequent association patterns $L_k$ is outputted.

Extraction of Two-level Tree-structure Patterns

Figure 12:
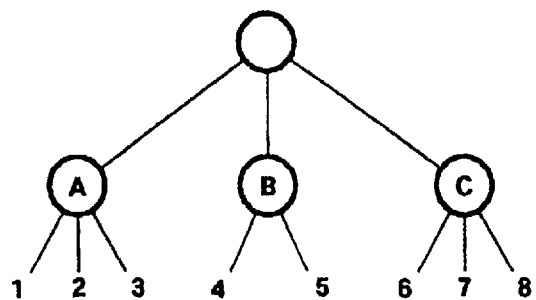
FIG. 12 is an example of two-level tree-structure.

Frequent association patterns for general tree-structured data can be extracted by the above-mentioned method. However, as for tree structure, if it is limited to two-level tree structure as shown in FIG. 12, calculation can be more efficient and faster than the aforementioned general tree structure. First, the terms on group labels and items are explained. In two-level tree-structure data, a pattern is a set of labeled sets, and a labeled set g=(1, A) is a pair of a label 1∈I and a set of items A∈I. A group label refers to a label 1 of a labeled set, and an item refers to an element of a set of items of a labeled set. In FIG. 12, A, B and C are group labels and 1, 2, . . . , 8 are items. Moreover, in a group (L, { }) comprising a label L and a null set of items { }, L is the group label.

Extraction System of Two-level Tree-structure Patterns

A block diagram and a flowchart of a frequent association pattern extraction system in the case of two-level tree-structure are the same as those of general tree structure just as shown in FIG. 4 and FIG. 5. However, to allow efficient processing, a candidate pattern generating device (FIG. 4, block 440) and its method of implementation (FIG. 5, block 550) and a counting device (FIG. 4, block 420) and its method of implementation (FIG. 5, block 540) are different. This counting device allows processing even if two or more groups in a pattern have the same group label. The following paragraphs describe a method of generating candidates and efficient method of counting for two-level tree-structured data.

Method of Generating Candidate Patterns for Two-level Tree-structured Patterns

The outline of extraction of two-level tree-structure patterns is the same as tree structure of arbitrary number of phases as illustrated in FIG. 8 and FIG. 6. To calculate efficiently, however, the method of Join is partially different.

<Join Method for Two-level Tree-structure>

Instead of considering what patterns of size k are generated when two patterns of size (k−1) are joined, consideration is focused on what two subpatterns of a size (k−1) pattern of size k can be divided into. A pattern of size k≧3 is classified into the following four types based on the last two elements. In each type, to allow a pattern of size k to be generated by joining two subpatterns of size (k−1), a pattern of size k is divided into two subpatterns of size (k−1).

Type A: The last two elements of the pattern are the items belonging to the same group.

Type B: The last element of the pattern is a group label, and the last group comprises only group labels. Besides, the second element from the last is an element of the second group from the last.

Type C: The last element of the pattern is an item of the last group, and the second element from the last is a group label (the last group comprises the group label and item). Moreover, this type is classified into Type C1 and Type C2 based on the third element from the last.

Figures 13, 14:
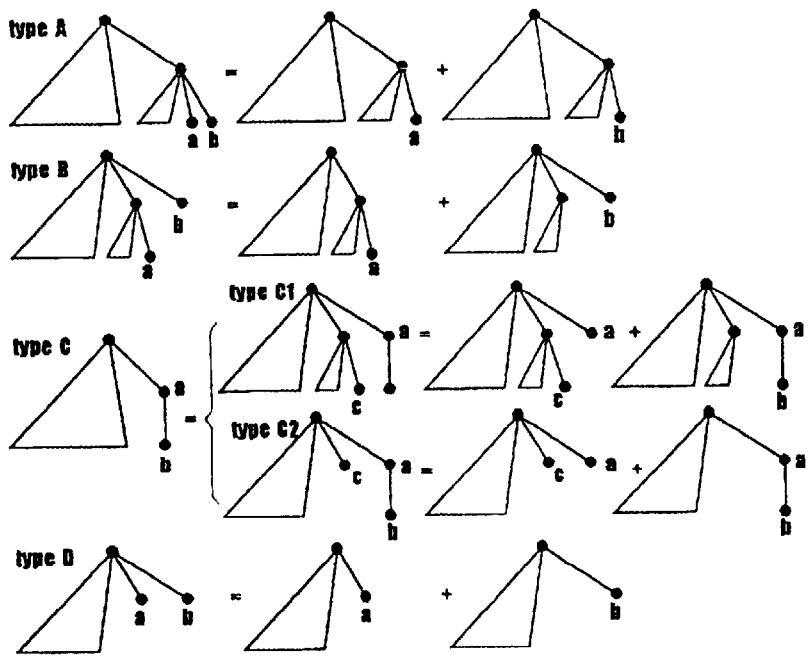
FIG. 13 is a diagram showing pattern classification.
FIG. 14 is an example of candidate pattern generation.

Type D: The last two elements are group labels (namely, the last two groups are both groups of group labels only). FIG. 13 shows these classifications and subpatterns of size k−1 to be joined for generating patterns of size k. In this diagram, triangles indicate subpatterns and subgroups. Since each element is either a group label or an item, every pattern must be classified into one of the above four patterns. Thus, whatever pattern is to be generated, it can be generated by using one of the expressions in FIG. 13. In case the last group and the second group from the last have the same group label, care must be taken since the order of groups changes. Candidate generation comprises the following two phases just as candidate generation of tree structure of an arbitrary number of phases.

<Join Phase (FIG. 8, Step 810)>

A set of frequent association patterns $L_k$ is joined with $L_k$ to generate a set of patterns of size k+1. If a pattern $p_1 \in L_k$ matches with any of the subpatterns on the right side of FIG. 13, a pattern $p_2 \in L_k$ is searched, and then $p_1$ and $p_2$ are joined to generate a new candidate pattern, which is put into $C'_{k+1}$. $L_k$ is sorted in a lexicographic order in advance to limit the range of the patterns to join $p_1$ so that it is not necessary to search all of $L_k$ for finding a pattern to be joined with $p_1$.

<Prune Phase (FIG. 8, Step 820)>

If the support value for any subpattern of size k to be generated from a candidate pattern of size k+1 is smaller than the minimum support threshold, this candidate pattern is removed from $C'_{k+1}$. To efficiently see if every k-subpattern is an element of $L_k$ in an efficient manner, a hash-tree storing $L_k$ is used. FIG. 14 shows an example of $L_3$ and $C_4$ after finishing Join and Prune. In the Join phase, a pattern $p_1$ joins $p_3$ to generate $c_1$ and $c_3$. A pattern $p_3$ joins $p_5$ to generate $c_2$. Also, $p_3$ joins $p_4$ to generate $c_4$. In the Prune phase, a subpattern of $c_1$ {(1, {3, 5})} and a subpattern of $c_2$ {(1, { }), (1, { }), (2, { })} are not in $L_3$, so $c_1$ and $c_2$ are removed.

Counting of Two-level Tree-structured Data

Figure 15:
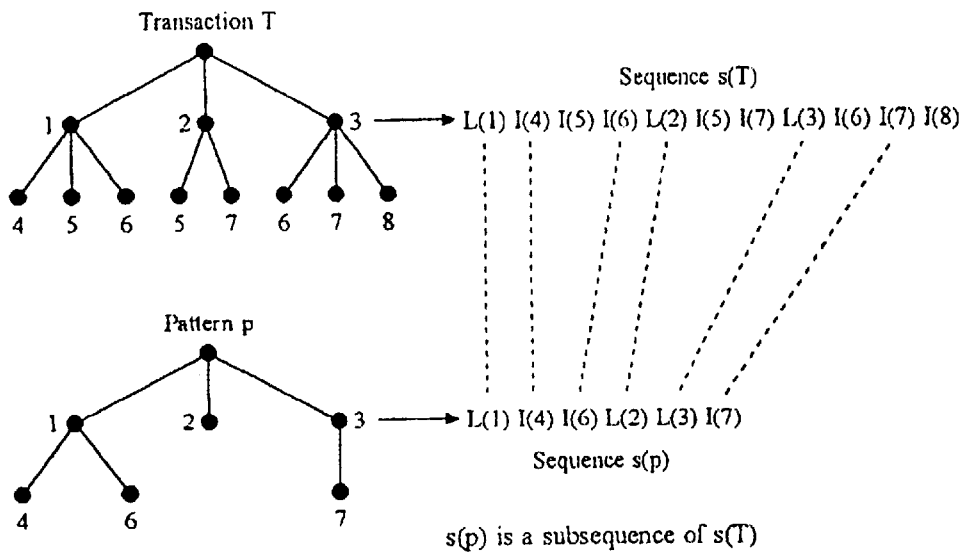
FIG. 15 is an example of sequent matching.
Figure 16:
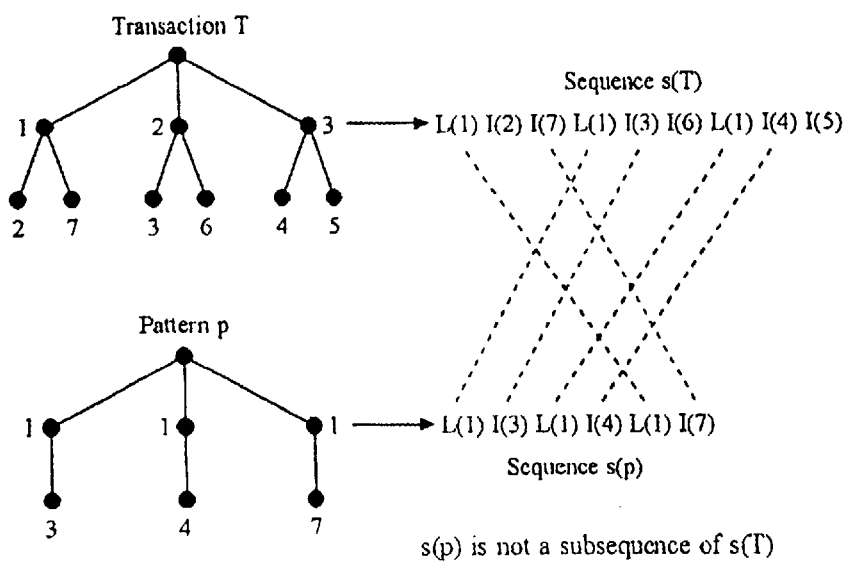
FIG. 16 is another example of sequent matching.

The device and method for counting two-level tree-structured data are somewhat different from those for tree structure data of an arbitrary number of phases. To count support for patterns, it is necessary to efficiently check whether or not patterns match transactions. Transactions and patterns are converted into a sequence by the method mentioned later, so it has to be checked whether or not a sequence of patterns is a subsequence of a sequence of transactions (see FIG. 15). It should be noted that if an item I in a sequence converted from patterns and transactions is used for matching, a group label L of a group including each item I must also be used for matching. While matching is basically checked by the above method, groups having the same group label are allowed so that matching can occur even when it is not a subsequence as in the example of FIG. 16, and thus special process should be implemented to groups having the same group label (details are described hereafter in the paragraph explaining matching of clusters).

Device for Counting Two-level Tree-structured Data

Figure 17:
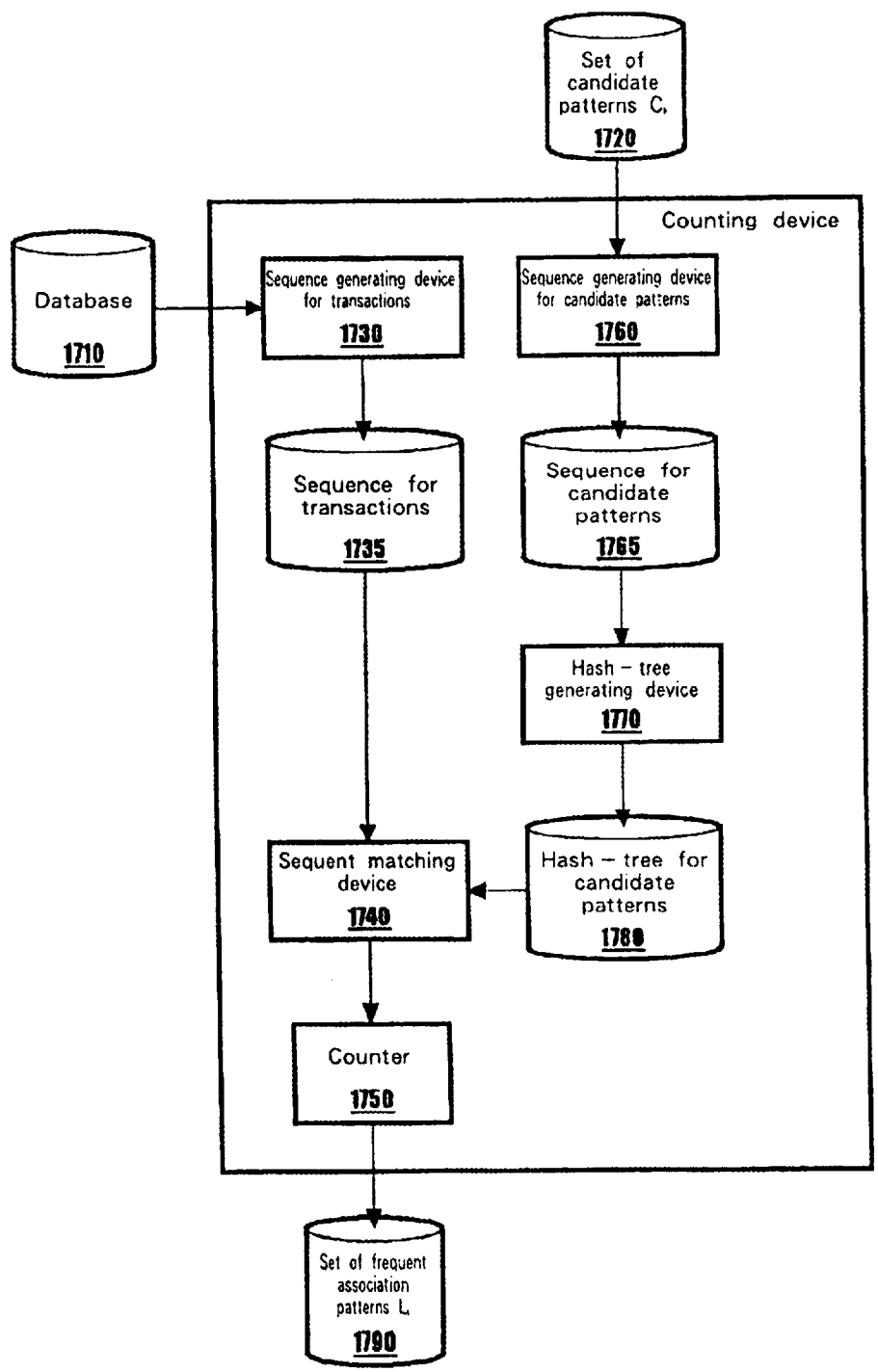
FIG. 17 is a block diagram of a counter.

FIG. 17 shows a block diagram of a device for counting two-level tree-structured data. A device for counting two-level tree-structured data receives a database (1710) and a set of candidate patterns $C_k$ (1720) as input, counts the number of transactions matching with those patterns, and then outputs as a set of frequent association patterns $L_k$ (1790) the patterns that occurred with frequency equal to or exceeding a threshold. A database 1710 is a database to be input and stores a set of transactions. A set 1720 is a set of candidate patterns $C_k$. The database (1710) and the set of candidate patterns (1720) are input to the counting device. Block 1730 is a sequence generating device for transactions. Transactions read from the database (1710) are converted into a sequence for transactions (1735) by a sequence generating device for transactions (1730). The method of conversion is described later. A sequence 1735 is a sequence for transactions, which was generated by the sequence generating device for transactions (1730). A sequence for transactions (1735) is also inputted into a sequent matching device (1740). Block 1740 is a sequent matching device of which input is a sequence for transactions (1735) and checks whether there are patterns matching with the read transactions by using a hash-tree for candidate patterns (1780). As a result of checking the matching of the sequence, if there are patterns matching with the transactions, it passes the patterns to the counter. Block 1750 is a counter that counts the number of transactions in which the patterns in a set of candidate patterns $C_k$ occurred. The counter (1750) increases count of the patterns inputted from a sequent matching device (1740) by 1. Block 1760 is a sequence generating device for candidate patterns, which generates a sequence from the patterns in a set of candidate patterns $C_k$. A sequence 1765 is a sequence for candidate patterns generated by a sequence generating device for candidate patterns (1760). The sequence for candidate patterns (1765) is inputted into a hash-tree generating device (1770). The hash-tree generating device (1770) receives as input the sequence for candidate patterns (1765) for all the patterns of the set of candidate patterns $C_k$ (1720) generated by the sequence generating device for candidate patterns (1760) so as to generate a hash-tree for candidate patterns (178). The hash-tree 1780 is a hash-tree for candidate patterns generated by the hash-tree generating device (1770), and is inputted into a sequent matching device. Block 1790 is a set of frequent association patterns $L_k$ outputted by a counting device as the patterns having occurred frequently, namely with frequency equal to or exceeding a threshold (minimum support value), after checking the patterns in a set of candidate patterns $C_k$ (1720) as to whether there were matching patterns for all the transactions and counting their occurrence frequency. The sequent matching device (1750) is explained further in detail later.

Method of Counting Two-level Tree-structured Data

Figure 18:
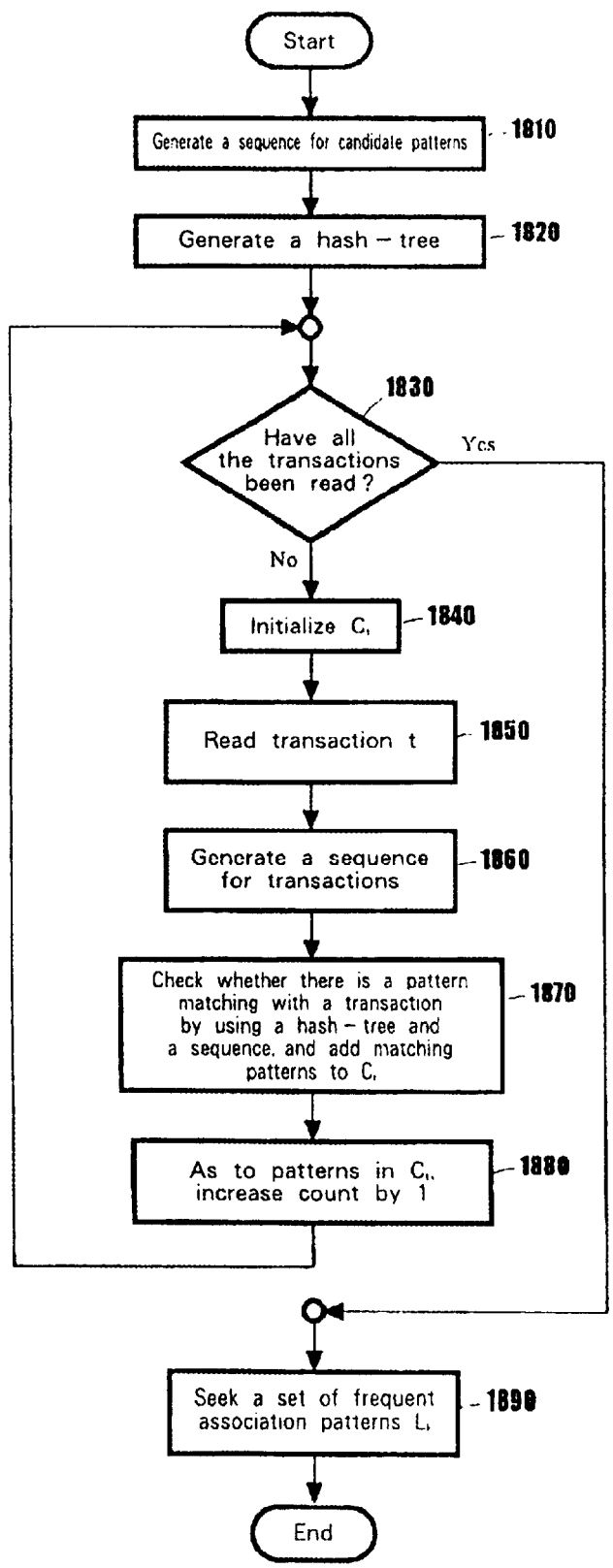
FIG. 18 is a flowchart of counting method of two-level tree-structure.

FIG. 18 shows a flowchart of a method of counting two-level tree-structured data. FIG. 18 is very similar to a flowchart of counting tree-structured data of an arbitrary number of phases (FIG. 11). Counting of two-level tree-structured data is implemented as follows. First, a sequence for candidate patterns is generated for all the patterns of the set of candidate patterns $C_k$ and is stored in a hash-tree, And then basically all the transactions are read one by one, converted into a sequence for transactions, and matching patterns are searched therefrom by using a hash-tree to increase count by 1 in the case of matching, and such operations are repeated until lastly the patterns with frequency equal to or exceeding a threshold (minimum support value) are sought as a set of frequent association patterns $L_k$.

In FIG. 18, a sequence for candidate patterns is generated for all the patterns of the set of candidate patterns $C_k$ (step 1810). The method of generating a sequence for candidate patterns is described later. Next, in step 1810, a sequence for candidate patterns generated for all the patterns of the set of candidate patterns $C_k$ is stored in a hash-tree (step 1820). The method of storing in a hash-tree is described later. At a conditional branch (step 1830), it is checked whether all the transactions have been read, and if yes, it moves on to step 1890. If no, it proceeds to step 1840 since all the transactions have not been checked. In step 1840, a set $C_t$ is initialized ($C_t$ is rendered as $\Phi$) temporarily storing matching patterns. In step 1850, one transaction t is read from a database. In step 1860, a sequence for transactions is generated from the read transaction t. The method of generating a sequence for transactions is described later. In step 1870, it is checked by using a hash-tree whether there are patterns matching with the transaction t. If there is one, it is added to $C_t$. In step 1880, such count is increased by 1 for all the patterns included in $C_t$. If step 1880 is completed, it proceeds to step 1830. This processing is repeated for all the transactions. If processing for all the transactions is completed, it proceeds to step 1890. In step 1890, it is checked for all the patterns of the set of candidate patterns $C_k$ whether their count is equal to or exceeding a threshold (minimum support value), and if so, add such patterns to $L_k$.

<Converting Candidate Patterns to a Sequence (Step 1810)>

Figure 19:
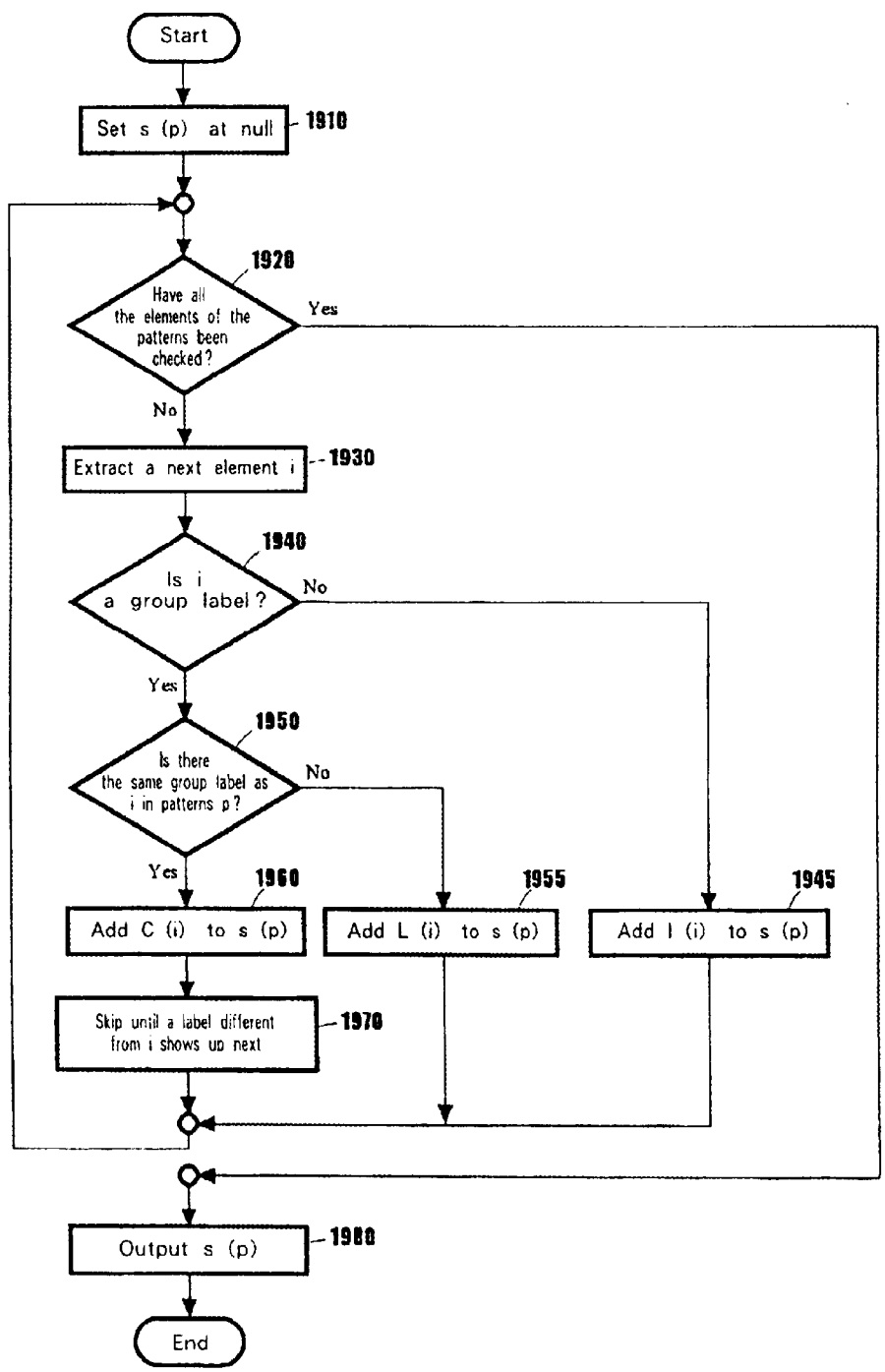
FIG. 19 is a procedure for generating a sequence for candidate patterns.

To efficiently find the candidate patterns in $C_k$ matching with a given transaction t, candidate patterns are stored in a hash-tree. In order to deal with cases where a candidate pattern has a plurality of groups with the same group label, each pattern p is converted into a sequence s(p) by the following procedure. FIG. 19 shows a procedure for generating a sequence for candidate patterns when a pattern p is given, In step 1910, s(p) is made null, In step 1920, it is checked whether all the elements in the candidate patterns have been examined, and if yes, it proceeds to step 1970, and if no, to step 1930. In step 1930, next element i in the pattern p is extracted, and then it proceeds to step 1940. Here, if there is a pattern p={(1, {2, 3}), (4, { }), (5, {6})}, the elements to be extracted are 1, 2, 3, 4, 5 and 6 in order. At a conditional branch of step 1940, if an element i is a group label, it proceeds to step 1950. If not a group label, then it proceeds to step 1945. In step 1945, I(i) is added to a sequence s(p). At a conditional branch of step 1950, if the same group label as an element i is in a pattern p, it proceeds to step 1960. If none other than it exists, it proceeds to step 1955. In step 1955, L(i) is added to a sequence s(p). In step 1960, C(i) is added to a sequence s(p). C(i) represents all the groups with a group label of i. These groups are called clusters. In step 1970, all the elements in a cluster are skipped, and it proceeds to a next group with a different group label. If an element is added to a sequence s(p) in one of step 1945, 1955, or 1960, it returns to step 1920, This is repeated until all the elements are through with it. However, if the same group label exists, elements of these groups are skipped (step 1970). If processing of all the elements is completed in step 1920, it proceeds to step 1980. In step 1980, an acquired sequence s(p) is outputted. As abovementioned, there are three types of elements, namely C (cluster), L (label) and I (item). For instance, a pattern {(1, {2, 3}), (2, {1, 3}), (2, {2, 4}), (3, {2})} is converted into a sequence <L(1), I(2), I(3), C(2), L(3), I(2)>. Here, the second and third groups in the pattern are forming a cluster. If a pattern has a cluster, a process for processing a cluster is necessary on counting.

<Storing Candidate Patterns in a Hash-tree (Step 1820)>

Figure 20:
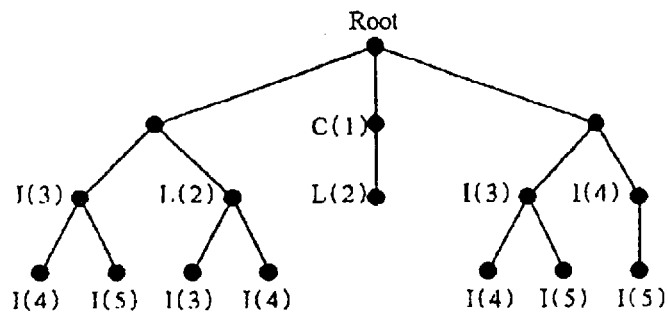
FIG. 20 is an example of a hash-tree.

First, a sequence of all the patterns in $C_k$ is stored in a hash-tree, An internal node of a hash-tree is a hash table. When a sequence s(p) is added to a hash-tree, it starts from a root node and goes down the tree scanning the sequence. At a node located at depth d, a branch to follow is decided by applying a d-th element of s(p) to a hash function. In this hash-tree, a prefix common to all the patterns is shared by the paths from the root node, and a sequence of patterns can be identified by the path from a root node to a leaf node. FIG. 20 shows an example. For instance, in FIG. 20, patterns <L(1), I(3), I(4)> and <L(1), I(3), I(5)> arrive at leaves I(4) and I(5) from the root via nodes L(1) and I(3) respectively. The paths of L(1) and I(3) that are common in the sequence are shared.

<Converting Transactions Into a Sequence (Step 1860)>

Figure 21:
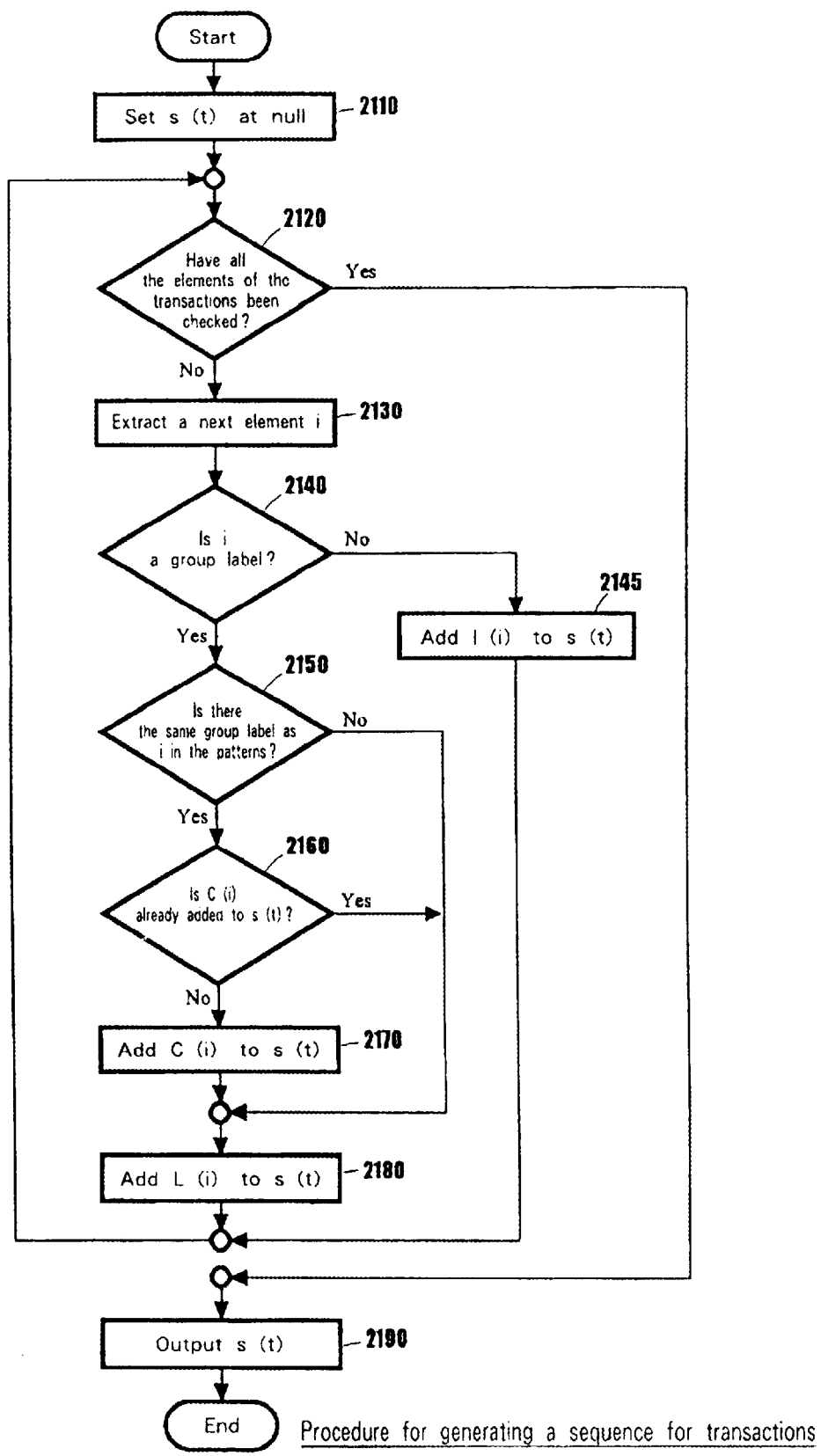
FIG. 21 is a procedure for generating a sequence for transactions.

If transaction t is given, first of all, the following procedure is used to convert t into sequence s(t). FIG. 21 shows a procedure for generating a sequence for transactions. In step 2110, s(t) is made null. In step 2120, it is checked whether all the elements in the transaction have been examined, and if yes, it proceeds to step 2190, and if no, to step 2130. In step 2130, next element i in the transaction t is extracted, and then it proceeds to step 2140. Here, if there is a transaction t={(1, {2, 3}), (4, { }), (5, {6})}, the elements to be extracted are 1, 2, 3, 4, 5 and 6 in order, At a conditional branch of step 2140, if an element i is a group label, it proceeds to step 2150. If not a group label, then it proceeds to step 2145. In step 2145, I(i) is added to a sequence s(t). At a conditional branch of step 2150, it is checked whether there is the same group label as an element i in the transaction. And if there is, it proceeds to step 2160. If none other than it exists, it proceeds to step 2180. At a conditional branch of step 2160, it is checked whether C(i) is already added to a sequence s(t). If already so, then it proceeds to step 2180. If not, it proceeds to step 2170. In step 2170, C(i) is added to a sequence s(t). In step 2180, L(i) is added to a sequence s(t). If a plurality of group labels i exist in the transaction t, L(i) as well as C(i) is added simultaneously to s(t). Once the above processing is performed, it returns to step 2120. At a conditional branch of step 2120, if processing for all the elements in the transactions is completed, it proceeds to step 2190. In step 2190, an acquired sequence s(t) is outputted. If a group with the same label exists, the label has been processed twice, namely as a cluster and as an individual element.

Sequent Matching Device

Figure 22:
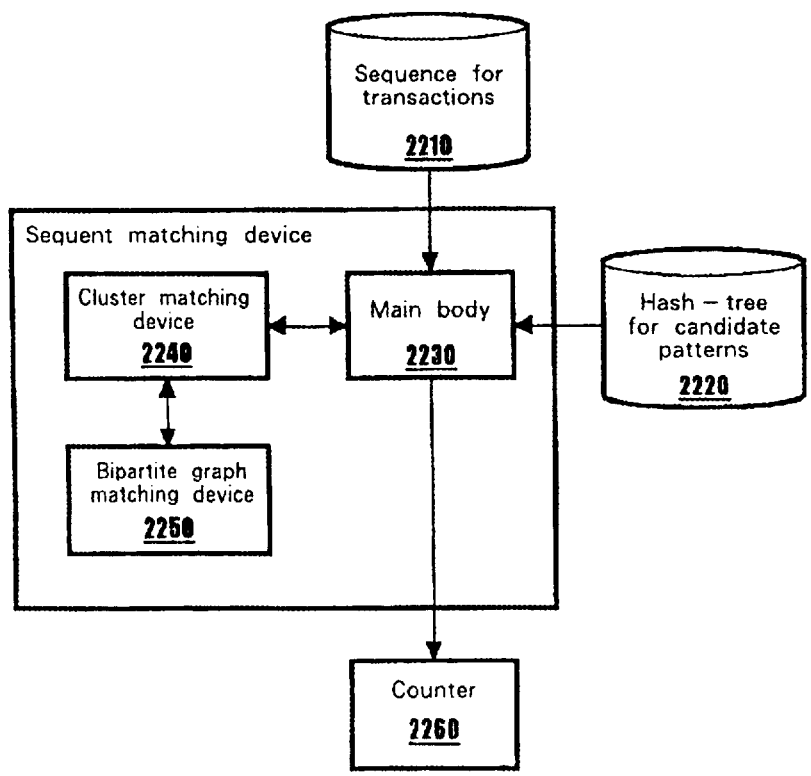
FIG. 22 is a block diagram of sequent matching.

A sequent matching device (FIG. 17, block 1740) examines matching between a sequence for transactions generated from transactions and a sequence for candidate patterns stored in a hash-tree for candidate patterns. It conducts matching of clusters for a hash-tree as required, and uses for that purpose a function of calculating matching of a bipartite graph. FIG. 22 shows details of a sequent matching device (block 1750). In FIG. 22, a sequence 2210 is a sequence for transactions (FIG. 17, 1735). A hash-tree 2220 is a hash-tree for candidate patterns (FIG. 17, 1780). Block 2230 is a main body of a sequent matching device, and matching of a sequence is basically tested by this device. If a cluster exists in a transaction, however, matching of a cluster is tested by a cluster matching device (2240). A cluster matching device (2240) invokes a bipartite graph matching device (2250) to perform a matching by a bipartite graph.

<Counting Method>

In order to detect any candidate pattern matching with transaction t, the following procedure is applied. The applied procedure depends on which node it is currently located at when following a hash-tree from the root, Root node: Hashes each element of s(t), and recursively applies this procedure to a node in a corresponding bucket. For whatever pattern p matching with transaction t, the first element of s(p) must exist in s(t). All the elements in s(t) are hashed so that any pattern starting from an element not existing in s(t) can be ignored.

Internal node with an I or L label: It is assumed that an element e in s(t) is hashed to arrive at this node. An element following e of s(t) is hashed, and this procedure is recursively applied to a node in a corresponding bucket.

Internal node with a C label: Constructs a bipartite graph and detects candidate patterns matching with clusters in transactions. Next, an element e in s(t) is hashed to arrive at this node. This procedure is recursively applied to any patterns p that has a cluster matching with t, namely to a suffix tree of p.

Leaf node: If it arrives at a leaf node, it means that a pattern matching with the transaction is discovered.

Cluster Matching

Figure 23:
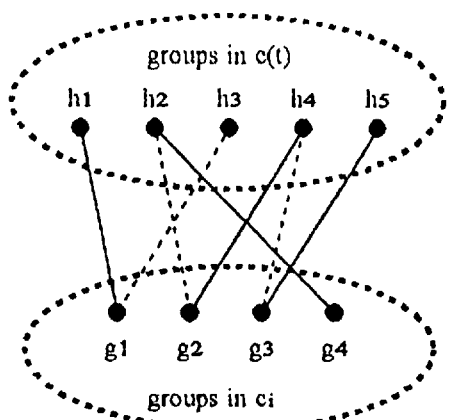
FIG. 23 is an example of a bipartite graph matching.

Attention is paid to a node with a C label in a hash-tree. A node has two or more clusters, which are a part of a pattern and have a common prefix. C={$c_1, c_2, \ldots, C_k$} represents a set of clusters. A transaction t, when arriving at this node, includes a cluster c(t), which has the same group label as $c_i$ (i=1 ... k). The object is to detect any cluster matching with c(t) and included in C. The method of determining whether a single cluster $c_i$ matches with c(t) is explained. First, it is assumed that $c_i$ has n groups and c(t) has m groups (n≦m). It is also assumed that $c_i$={$g_1, g_2, \ldots, g_n$} and c(t)={$h_1, h_2, \ldots, h_m$}. A bipartite graph $G_i=(c_i, c(t); E_i)$ is searched whereby, if $g_x \epsilon c_i$ matches with $h_y \epsilon c(t)$, and only when they match, an edge $(g_x, h_y) \epsilon E_i$ exists. FIG. 23 shows an example of a bipartite graph. To determine whether $c_i$ matches with c(t), it just has to be checked whether or not the size of the maximum value of bipartite matching of $G_i$ is n. In FIG. 23, a straight line shows the maximum edge of bipartite matching. If all the groups of $c_i$ are covered by matching, $c_i$ matches with c(t) in this case. In order to efficiently construct all graphs $G_i=(c_i, c(t); E_i)$ for all $c_i \epsilon C$, a hash-tree that stores all candidate groups of $c_i$ (i=1, ... , k) is constructed in advance. For each group $h_j \epsilon c(t)$, all the groups matching $h_j$ are identified by using a hash-tree, and a corresponding edge is added to the graphs. If the above procedure is implemented, all the graphs are known so that all the clusters matching with a transaction t can be detected. In some cases, it can be checked whether or not $c_i$ matches with c(t) before completely constructing a bipartite graph $G_i$.

Embodiments to which the Present Invention is Applied.

<Text-mining System>

In companies, the departments called a call center or a customer service are established to deal with inquiries and claims from customers by telephone and so on, namely to answer questions, teach a proper operating method and help improve products. Contents collected from customers are entered as text by an operator to be recorded and accumulated. Large amounts of accumulated record documents are analyzed so that questions and answers are prepared in advance as to frequently asked questions, and thus operators can share such knowledge so as to decrease their burden and response time and reduce costs. Besides, product deficiencies and the like can be used for improvement of functions and so on by advising a development department of what kind of claims are often made. It is also possible to analyze demands from customers and take advantage of them in development of a new product, While the number of inquiries collected from customers depends on size of a company, types of products and so on, there are companies that receive as many as tens of thousands of claims monthly, and the record documents accumulated in them have become an enormous amount. To analyze inquiries from customers, it is necessary to read through all the record documents and check what matters many of the inquiries and claims are related to. If there are tens of thousands of claims monthly, it is almost impossible to manually analyze all the documents, so it is inevitable to extract and check some of the documents by sampling them from the entire documents or leave it to the operator's subjective judgment.

Figure 24:
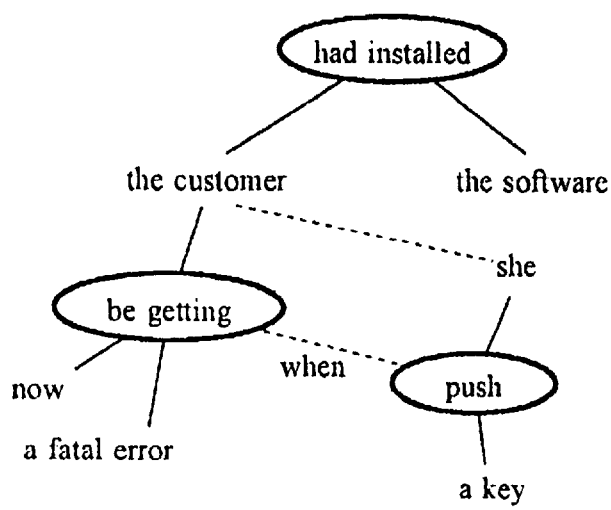
FIG. 24 is an example of a network.

Normally, an operator of a call center enters the contents of a phone call from a customer in a database in a natural language. As above-mentioned, an accumulated database stores records of questions, demands, dissatisfaction, admiration and so on, which may become important information for deciding a future operational policy of a company. In such a case, a pattern detecting device using the present invention can be applied to extract (data mining) important messages from an enormous database. While it is possible to regard sentences and a document as a set of words and simply apply a normal method of detecting correlation rules or time series patterns, this method usually fails. It is because imagining meaning of an original sentence from a pattern without structure is difficult, and besides, large amounts of patterns are detected making it nearly impossible to detect important patterns therefrom. On the other hand, it has become possible, by a technology of natural language processing, to automatically extract relations among words. A typical method of machine translation performs semantic analysis of an original sentence, constructs a structured tree (network) based on semantic relations among words, and after performing translation on that structured tree, translates it into another natural language and thus implements translation. As meaning of a word is decided depending on its positions in this structure, important patterns is detected from such a network. FIG. 24 shows an example of such a network. When large amounts of such networks are given, the partial graph is detected as a pattern.

Figures 25, 26:
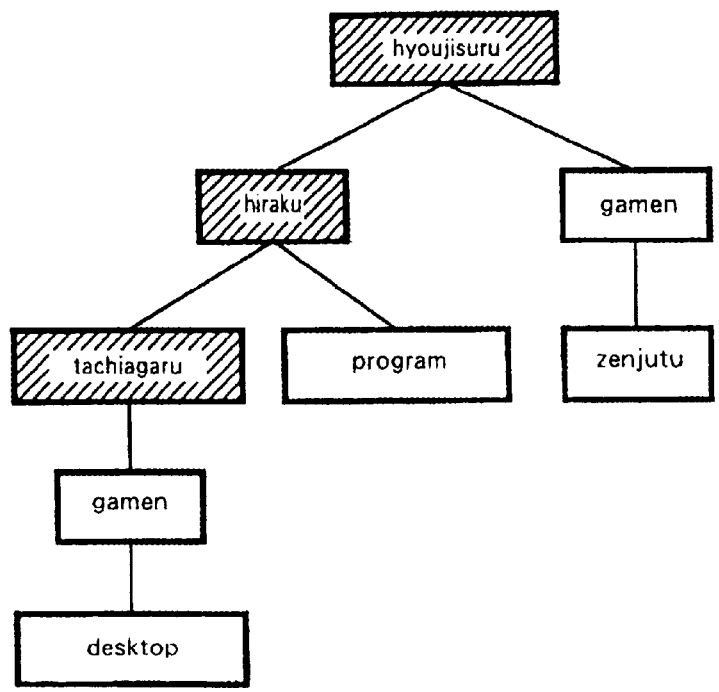
FIG. 25 is an example of a predicate-argument tuple.
FIG. 26 is an example of a constructed structured tree.

First, as a predicate plays the most important role in deciding meaning of a sentence, attention is paid to a predicate in a sentence. A predicate has another word in a directly or indirectly modifying relation to it as an argument word. A group of such words is called a "predicate-argument tuple." For instance, a sentence in FIG. 24 has three groups as shown in FIG. 25. While such groups do not have all the information of the original sentence, their amounts of information are markedly different from mere enumeration of words. They also allow easy imagination of the meaning of the original sentence. Such a predicate-argument tuple can be represented by a labeled set. A label is a predicate an element of the set is an argument word. A sentences or a document can be regarded as a set of labeled sets. Thus, if conversion into two-level tree-structure is implemented in this manner, frequent association patterns can be detected at higher speed by the method for detecting frequent association patterns demonstrated in the present invention. For instance, a pattern comprising a labeled set such as {(install {software A, driver B}), (get {error})} can be detected from a database.

<FAQ Generation System>

Currently, customers' voices are collected by companies not only by telephone, but also through various media such as e-mail and World Wide Web, and the number of them is such that analysis of them should desirably be automated. Thus, natural language analysis is performed on information from customers entered as text so as to generate structured data, and frequently occurring structured patterns are detected by the present invention, and by using such results, a system for supporting FAQ (frequently asked questions) is constructed.

Data Generation

As frequently occurring structured patterns are extracted from structured data, it is necessary to generate structured data from document data. For that purpose, first, a sentence is parsed, and a structured tree is constructed. Next, structured data is generated from the constructed structured tree data.

Generating Structured Tree Data

Data for extracting structured patterns can be generated by performing the following process on all document data. The following explains processing of morphological analysis, clause generation and modification structure construction (structured tree construction), For instance, the following words can be cut out by performing morphological analysis on a sentence "Watashi wa kaisha ni iku" (I go to the company).

["watashi," noun]
["wa," particle]
["kaisha," noun]
["ni," particle]
["iku," verb]

If clause generation is further performed, the following clause is generated.

["watashi," "wa"]
["kaisha," "ni"]
["iku,"]

Furthermore, the following modification structure is constructed by extracting modification structure. If such modification structure is represented in the form of a tree, then it is a structured tree.

["watashi"→"iku"]
["kaisha,"→"iku"]

As above, a structured tree can be constructed from a sentence. This is performed on every sentence.

Generating Structured Data

Next, structured data is generated from a constructed structured tree. Here, by way of example, a structured tree is used, which is constructed from a sentence "Desktop no gamen madewa tachiagaruga program o hirakoutosuruto zenjutsuno gamen ga hyoujisareru" (see FIG. 26). Moreover, in this diagram, a dark-colored node indicates a verb. Structured data comprises a plurality of groups (labeled sets). A group (a labeled set) comprises an element to be a label and other 0 or more elements, and in order to construct a FAQ generation supporting tool, a group is constructed here, which has a verb as a label and other words modifying the verb as its members. Also, as many such groups as the number of the verbs are generated, which is regarded as a piece of data. Tn the structured tree constructed above, the nodes ["Desktop"] and ["gamen"] are descendant nodes of the node ["tachiagaru"] that is a verb.

Figure 27:
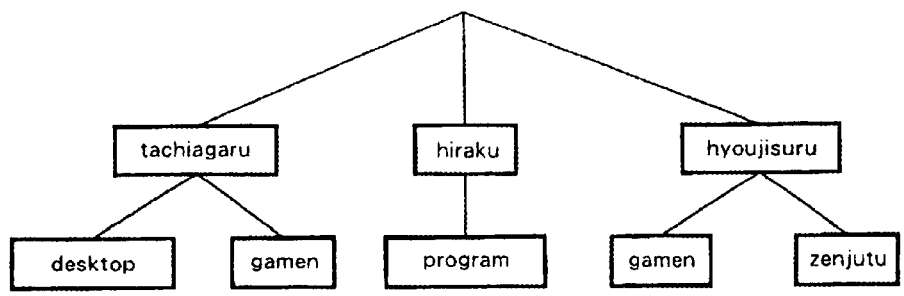
FIG. 27 is an example of generated structured data.

Accordingly, from these three nodes, with the verb ["tachiagaru"] as a label, a group (a labeled set) ["tachiagaru"] ("Desktop" "gamen") that has other nodes as its elements is generated. Likewise, a group "hiraku" ("program") is generated from ["program"] and a verb node ["hiraku"], provided that, while there are descendants of ["hiraku"] here such as ["Desktop"] and ["gamen"], they are not included in the same group as ["hiraku"] since there is a verb node ["tachiagaru"] on the way to their nodes. Likewise, a group ["hyoujisuru"] ("gamen" "zenjutsu") is generated from a verb node ["hyoujisuru"] and ["gamen"], ["zenjutsu"]. Thus, the groups generated from one sentence are put together to construct the following structured data (see FIG. 27).

"tachiagaru" ("Desktop" "gamen"), "hiraku" ("program"),
"hyoujisuru" ("gamen" "zenjutsu")

Thus, structured data is constructed from every sentence. Furthermore, as it is necessary to read the original sentences afterwards, a corresponding relation between the two is kept to be able to extract the original sentences from the identifiers of the constructed structured data.

Detecting Frequent Association Patterns

A minimum support value is given as a threshold to a large volume of structured data constructed above so that frequent structured patterns are detected by using the present invention.

FAQ Generation

To generate FAQ, it is necessary to take out the frequent association patterns detected by the present invention and structured data matching with them and further to analyze the original sentences of the structured data. First, a list of the detected frequent structured patterns and their frequencies is displayed. An arbitrary pattern is selected from a plurality of displayed patterns so that, of the structured patterns created from each document, only the data matching that pattern is extracted and displayed. For instance, the following pattern is selected.

"kidousuru" ("sai") "kiru" ("dengen")

Figure 28:
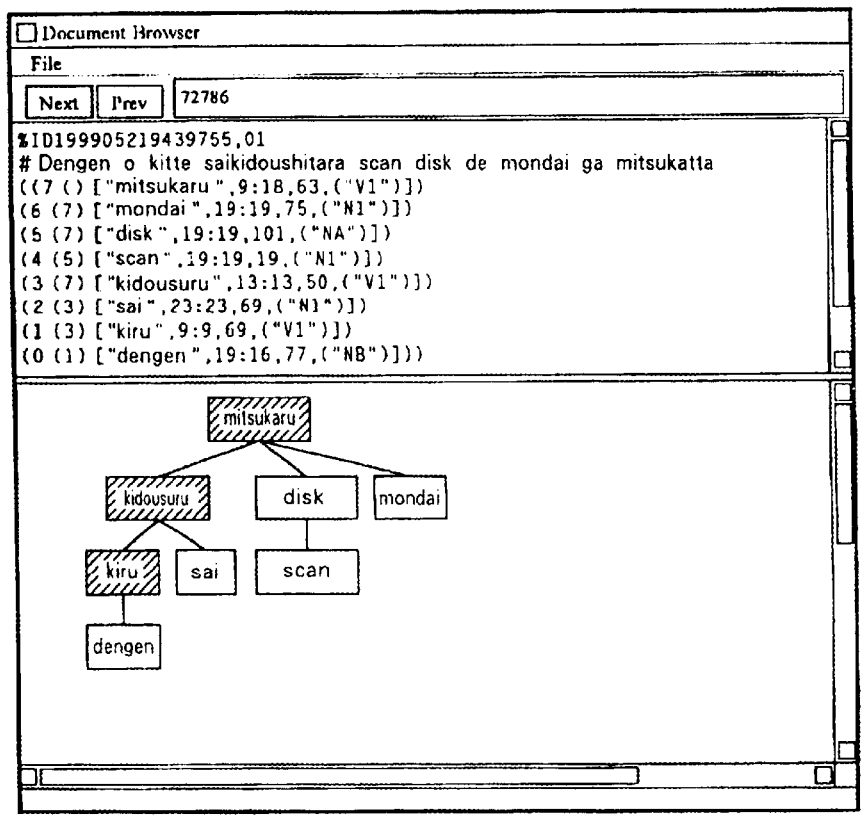
FIG. 28 is an embodiment of a document browser.

Then, a plurality of structured data matching the above pattern is displayed. If one piece of data is selected from the displayed structured data, a document browser (see FIG. 28) is activated and then the original sentence of the data can be seen. A sentence "Dengen o kitte saikidoushitara scan disk de mondai ga mitsukatta," namely the original document of the selected data is displayed in the upper part of the document browser shown in FIG. 28. Also, in the lower part of the browser, modification structure of the document is visually displayed to clarify how the document was analyzed into morphemes and the structure was constructed. Actually, to support FAQ generation, it is more beneficial to directly see a list of the original documents matching frequently occurring patterns than to see parsing or individual data, and thus it provides a function of showing a list of the original documents. It further provides a function of showing not only the original sentences of frequent association patterns but also the sentences before and after the original sentences, namely providing a function of showing the entire document including the original sentences.

<Text Classification System>

When dealing with large amounts of documents, a desire to automatically classify documents is very significant. It is possible, by using a method for detecting frequent association patterns of the present invention, to classify text. As structured patterns are highly readable, it is easy to explain what consequently acquired classification of text is like. As an example of automatically classifying text, a system for automatically classifying e-mail can be constructed. In the case of engaging in a task that involves daily arrival of tens of e-mail, it is difficult to find necessary mail when required unless classified into mail folders corresponding to subjects of mail. It becomes difficult to do this classification work manually as the number of mail increases. The software dealing with mail usually provides a user with a function of classifying e-mail into folders (categories) and retaining it. E-mail that has arrived is normally put into a special folder called "inbox" and moved to a related folder (category) and retained by a user. Although it is not so problematic while the number of arriving mail is small, trouble of this classification becomes considerable if tens of e-mail arrives daily. Accordingly, the present invention is applied to construction of an automatic classifier. The following explains the flow of this automatic classification of e-mail.

(a) A user manually classifies a part of the e-mail on hand into folders (categories).

(b) Rules for classification are created with the sets of mail manually classified in step (a) as first examples of classification. First, each of the mail is decomposed by natural language processing into sets of pairs of a predicate and an argument word to obtain a consequence $t_i$. If the target classification folder of each mail is f, then it is ($t_i$: $t_i$ U {f( )}) wherein an f-labeled null set f( ) is added to $t_i$. The present invention is applied to the acquired $t_i$ (i=1, . . . , n) to detect frequent association patterns. Lastly, the rules that have a term labeled as a folder (category) name in a conclusion part are generated. These rules are r1, . . . , rk, and certainty of each rule (probability of a rule holding) is calculated.

(c) The remaining mail that the user did not manually classify is automatically classified according to the (b) rules. First, the mail is decomposed by natural language processing into sets of predicates and argument words, where the consequence is t. Next, for each rule $r_i$ acquired in (b), it is checked whether it matches with t, and if it does, a score as to its extent of matching is calculated according to certainty of $r_i$. The mail is classified into a folder (category) with the highest score acquired.

(d) If there is an error in a consequence of automatic classification, the user corrects it manually. Classification of the manually corrected mail is added to a folder created in (a) and repeated from (b) so that accuracy of the automatic classifier becomes higher in stages.

Besides, a system involved in the present invention can be applied to a system for performing automatic selection of a person in charge of inquiries and troubleshooting. At windows of inquiries by electronic media (e-mail, Web) and troubleshooting, large amounts of various inquiries are received. Since one person cannot respond to all the inquiries appropriately, it is necessary to allocate them to persons in charge according to the contents. It can be applied to a system for automating this work. It can also be applied to a system for assisting database retrieval of documents such as newspaper articles, books and papers. If document retrieval is performed on an entire database where large amounts of documents are electronified, documents unrelated to what the user is interested in are detected and the documents originally sought are buried in them (just as in Web search engines). If the documents in the database are classified from various viewpoints in advance, it becomes possible to perform a search limiting to the documents that the user is interested in. It becomes possible to classify large amounts of documents and from varied viewpoints. In addition, it is needless to say that various applications are thinkable without deviating from the essence of the present invention.

Embodiment of Hardware Configuration

Figure 29:
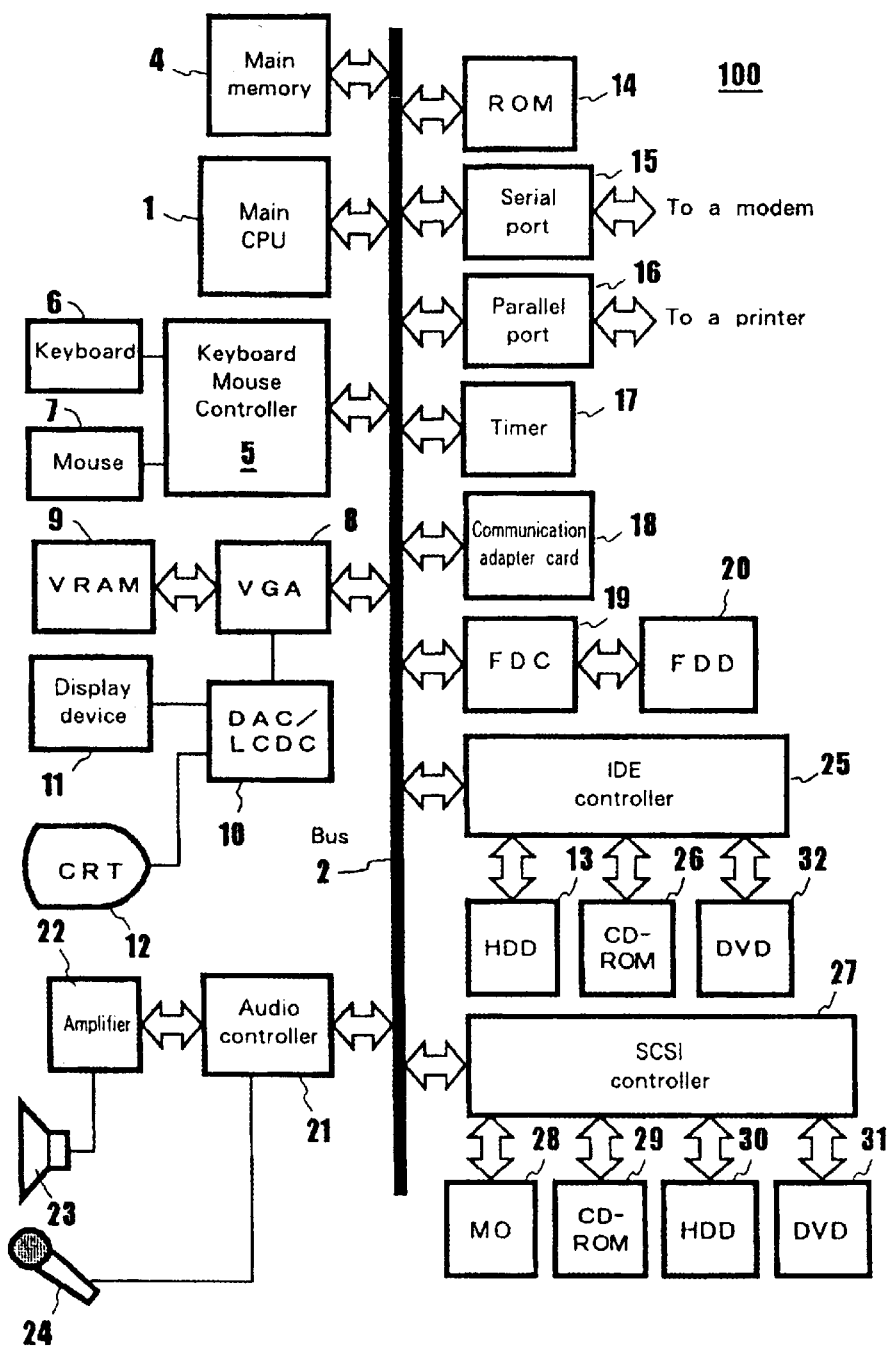
FIG. 29 is an embodiment of hardware used in a system of the present invention.

FIG. 29 shows an embodiment of hardware configuration used in a system of the present invention (detecting frequent association patterns, text mining, automatic FAQ generation, and text classification). System 100 comprises central processing unit (CPU) 1 and memory 4. CPU 1 and memory 4 are connected via bus 2, and via hard disk drive 13 as an auxiliary storage (or a storage media drive such as CD-ROM 26 or DVD 32) and IDE controller 25. Likewise, CPU 1 and memory 4 are connected via bus 2, and via hard disk drive 30 as an auxiliary storage (or a storage media drive such as MO 28, CD-ROM 29 or DVD 31) and 9 CST controller 27. Floppy disk drive 20 is connected with bus 2 via floppy disk controller 19.

A floppy disk is inserted into floppy disk drive 20, and this floppy disk, hard disk drive 13 (or a storage media such as CD-ROM 26 or DVD 32) and ROM 14 can store codes or data of a computer program and an operating system for issuing an instruction to CPU and so on in synergy with an operating system and implementing the present invention, which is executed by being loaded on memory 4. These codes of a computer program can also be compressed or split into several for storing on more than one media.

System 100 can further be equipped with user interface hardware and comprise pointing device (a mouse, a joystick, etc.) 7 or keyboard 6 for entry or display 12 for displaying detected frequent association patterns, a document browser and so on. It is also possible to connect with a printer via parallel port 16 or to connect with a modem via serial port 15. This system 100 can communicate with other computers, servers, etc. by being connected to a network via serial port 15 and a modem or a communication adapter 18 (ethernet or token-ring card), etc. It is also possible to exchange data over infrared rays or the radio by connecting a remote transmitter-receiver to serial port 15 or parallel port 16.

Speaker 23 receives via amplifier 22 sound or an audio signal D/A (digital/analog conversion) converted by audio controller 21 so as to output it as sound or voice. Audio controller 21 also makes it possible to A/D (analog/digital) convert audio data received from microphone 24 and incorporate into the system audio data from outside the system. It is also possible to substitute operations by voice commands for operations of detecting frequent association patterns by using an application such as ViaVoice (a trademark of IBM Corp.).

Thus, it will, be easily understood that the system of the present invention can be implemented by means of a communication terminal with a communication facility including an ordinary personal computer (PC) or a workstation, a notebook PC, a palmtop PC, a network computer, various household electrical appliances such as a TV set with a built-in computer, a game machine with a communication facility, a telephone, a fax, a portable telephone, a PHS and an electronic organizer or a combination of those. However, these components are quoted by way of illustration, and all of them are not essential components of the present invention.

Advantages of the Invention

The present invention allows all patterns of multiple-level structure such as a set of sets or a set of permutations to be automatically detected from data of complex structure. Also, the patterns thus detected are easier to intuitively understand than conventional patterns ignoring structure since they are closer to their original data structure. Users do not need to provide something like a template of patterns in advance, and besides, because of the high speed, processing of a large volume of data is also completed within a short time. Accordingly, it allows very important patterns to be easily detected from a large volume of databases.

What is claimed is:

1. A system for detecting frequent association patterns in a database of tree-structured data, comprising:

means for automatically generating an initial current set of candidate association patterns for counting;

means for counting association patterns in the database that match with the current set of candidate association patterns;

means for detecting frequent association patterns in the database from the result of said counting; and means for automatically generating a new current set of candidate association patterns for next counting from said detected frequent association patterns.

2. A text-mining system for extracting useful concepts from a large volume of text data, comprising:

(a) means for parsing sentences in the text data;

(b) means for generating a set of structured trees of text data based on the results of said parsing;

(c) means for automatically generating an initial current set of candidate tree-structured association patterns for counting;

(d) means for counting tree-structured association patterns in the set of structured trees that match with one or more of the candidate tree-structured association patterns in the current counting set of candidate tree-structured association patterns;

(e) means for detecting frequent tree-structured association patterns in the set of structured trees from the result of said counting; and (f) means for automatically generating a new current set of candidate tree-structured association patterns for next counting from said detected frequent tree-structured association patterns.

3. A text-mining system as in claim 2 for automatically generating a set of Frequently Asked Questions from a large volume of text data and further comprising:

(g) means for extracting original text data matching with said frequent tree-structured association patterns.

4. A text-mining system as in claim 2 for automatically classifying text data into a plurality of categories, and further comprising:

(g) means for detecting text data matching with said frequent tree-structured association patterns to classify the data into categories.

5. A method for detecting frequent association patterns in a database of tree-structured data, comprising the steps of:

automatically generating an initial current set of candidate association patterns for counting;

counting association patterns in the database that match with the current set of candidate association patterns;

detecting frequent association patterns in the database from the result of said counting; and automatically generating a new set of current candidate association patterns for next counting from said detected frequent association patterns.

6. A record medium comprising a program for detecting frequent association patterns in a database of tree-structured data, said program having a computer implement:

a function for automatically generating an initial current set of candidate association patterns for counting;

a function for counting association patterns in the database that match with the current set of candidate association patterns;

a function for detecting frequent association patterns in the database from the result of said counting; and a function for automatically generating a new set of candidate association patterns for next counting from said detected frequent association patterns.

* * * * *